United States Patent
Glass et al.

(10) Patent No.: US 12,204,858 B2
(45) Date of Patent: Jan. 21, 2025

(54) POST-MODEL FILTERING OF PREDICTIVE TEXT

(71) Applicant: Microsoft Technology Licensing, LLC, Redmond, WA (US)

(72) Inventors: Andrew Stuart Glass, Seattle, WA (US); Margaret Hope Magnus, Everett, WA (US); Roland Radtke, Brier, WA (US); Claes-Fredrik Urban Mannby, Mercer Island, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 339 days.

(21) Appl. No.: 17/358,932

(22) Filed: Jun. 25, 2021

(65) Prior Publication Data
US 2022/0414334 A1 Dec. 29, 2022

(51) Int. Cl.
*G06F 40/295* (2020.01)
*G06F 40/253* (2020.01)
*G06N 3/02* (2006.01)

(52) U.S. Cl.
CPC .......... *G06F 40/295* (2020.01); *G06F 40/253* (2020.01); *G06N 3/02* (2013.01)

(58) Field of Classification Search
CPC ...... G06F 40/295; G06F 40/253; G06F 40/30; G06F 3/0237; G06N 3/02; G06N 3/045
See application file for complete search history.

(56) References Cited

U.S. PATENT DOCUMENTS

| | | | | |
|---|---|---|---|---|
| 8,768,782 B1* | 7/2014 | Myslinski | ............. | G06F 16/284 705/26.1 |
| 9,037,967 B1* | 5/2015 | Al-Jefri | ................ | G06F 40/232 715/257 |
| 9,923,931 B1* | 3/2018 | Wagster | .................. | H04L 43/10 |
| 10,445,424 B2* | 10/2019 | Medlock | ............... | G06F 3/0237 |
| 10,742,577 B2* | 8/2020 | O'Dell | ................ | H04L 51/212 |
| 11,580,415 B2* | 2/2023 | Fei | ........................... | G06N 3/08 |
| 11,762,990 B2* | 9/2023 | Gururajan | ........... | G06F 21/6227 726/23 |
| 2016/0294755 A1* | 10/2016 | Prabhu | .................. | H04L 51/046 |

(Continued)

FOREIGN PATENT DOCUMENTS

CN 111753044 A * 10/2020 ............. G06F 16/31

*Primary Examiner* — Richemond Dorvil
*Assistant Examiner* — Nadira Sultana

(57) ABSTRACT

In non-limiting examples of the present disclosure, systems, methods and devices for filtering predictive text surfacing candidates are provided. A predictive text filtering model may be maintained. The predictive text filtering model may comprise a plurality of terms that are associated in the predictive text filtering model with a precarious classification, and a range of a number of words for filtering cooccurrences of precarious and other precarious or blocklist terms from the plurality of terms. A text input may be processed with a predictive text model. A plurality of surfacing candidates may be determined based on the processing of the text input with the predictive text model. The predictive text filtering model may be applied to a surfacing candidate of the plurality of candidates. The surfacing candidate may be filtered from further processing. At least one non-filtered surfacing candidate may be displayed.

20 Claims, 14 Drawing Sheets

(56) References Cited

U.S. PATENT DOCUMENTS

| | | | | |
|---|---|---|---|---|
| 2021/0004437 A1* | 1/2021 | Zhang | .................. | G06F 40/205 |
| 2021/0097239 A1* | 4/2021 | Arora | ...................... | G06F 40/30 |
| 2021/0142789 A1* | 5/2021 | Gurbani | .................. | G10L 15/16 |
| 2021/0149996 A1* | 5/2021 | Bellegarda | .......... | G10L 15/1815 |
| 2021/0319093 A1* | 10/2021 | Molloy | .................. | G06N 3/084 |
| 2022/0335217 A1* | 10/2022 | Panwar | .................. | G06F 40/30 |

\* cited by examiner

FIG. 7D  CONTINUED FROM FIG. 7C
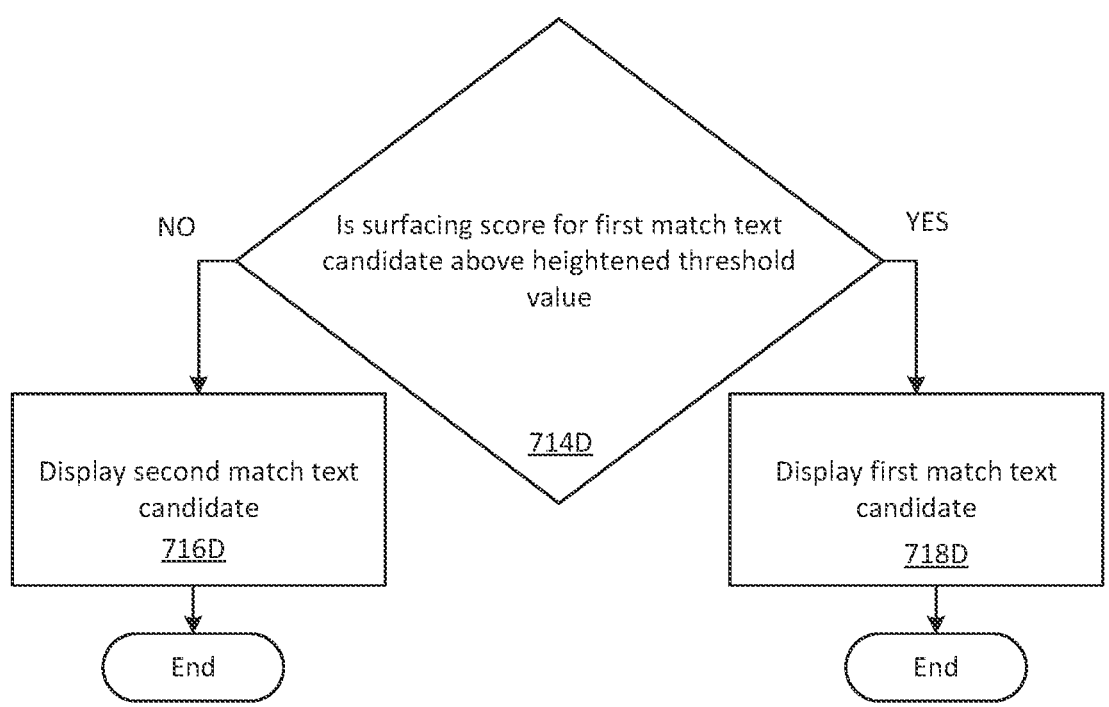

POST-MODEL FILTERING OF PREDICTIVE TEXT

BACKGROUND

Text input on computing devices increasingly makes use of text prediction to support user input. Text prediction systems leverage language models that determine candidate input based on existing text input by a user and/or other signals. These systems are trained to avoid predicting and surfacing obscene language which may be offensive to users. The task of suppressing such language is feasible when dealing with a single word by using a dictionary. However, the problem is far more complex in practice because obscene and offensive concepts can be composed by combining two seemingly harmless words or terms. Additionally, as prediction systems become more capable and predict longer text sequences, the possibility for generating offensive ideas increases. Further, text prediction systems are increasingly utilizing neural prediction models, which are essentially black boxes that the outputs cannot be predetermined for. Limiting offensive language predictions with such models cannot be done through traditional means of reviewing language models.

Users frequently transition between their devices based on various factors (e.g., user location, time of day, activity being performed). Transitioning activities from a first device to a second device can be time consuming because not all devices may include the same applications and/or access to the same resources.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for filtering predictive text surfacing candidates that include precarious terms. According to a first example, a computer-implemented is provided. The computer-implemented method comprises: maintaining a predictive text filtering model comprising: a plurality of terms that are associated in the predictive text filtering model with a precarious classification, and a range of a number of words for filtering cooccurrences of precarious terms from the plurality of terms, processing a text input with a predictive text model; determining, based on the processing of the text input with the predictive text model, a plurality of surfacing candidates, each of the plurality of surfacing candidates comprising at least one word; applying the predictive text filtering model to a surfacing candidate of the plurality of candidates; filtering, by the predictive text filtering model, the surfacing candidate; and causing at least one non-filtered surfacing candidate to be displayed.

According to an additional example, a system is provided. The system comprises: a memory for storing executable program code; and a processor, functionally coupled to the memory, the processor being responsive to computer-executable instructions contained in the program code and operative to: access a predictive text filtering model comprising: a plurality of terms that are associated in the predictive text filtering model with a precarious classification, and a range of a number of words for filtering cooccurrences of precarious terms from the plurality of terms, process a text input with a predictive text model; determine, based on the processing of the text input with the predictive text model, a plurality of surfacing candidates, each of the plurality of surfacing candidates comprising at least one word; apply the predictive text filtering model to a surfacing candidate of the plurality of candidates; filter, by the predictive text filtering model, the surfacing candidate; and cause at least one non-filtered surfacing candidate to be displayed.

In another example, a computer-readable storage device is provided. The computer-readable storage device comprises executable instructions that, when executed by a processor, assist with filtering predictive text surfacing candidates, the computer-readable storage device including instructions executable by the processor for: receiving a text input; displaying the text input on an application user interface; processing the text input with a predictive text model; determining, based on the processing of the text with the predictive text model, a plurality of surfacing candidates, each of the plurality of surfacing candidates comprising at least one word; applying a predictive text filtering model to a surfacing candidate of the plurality of candidates, wherein applying the predictive text filtering model comprises: determining that the surfacing candidate or the text input includes a first term that is associated with a precarious classification in the predictive text filtering model, determining that the surfacing candidate or the text input includes a second term that is associated with the precarious classification in the predictive text filtering model, and determining that the first term is within a range of a number of words for filtering cooccurrences of precarious terms; filtering, by the predictive text filtering model, the surfacing candidate; and displaying at least one non-filtered surfacing candidate on the application user interface.

BRIEF DESCRIPTION OF THE DRAWINGS

Non-limiting and non-exhaustive examples are described with reference to the following figures:

FIGS. 7C and 7D are an exemplary method for applying a text filtering model to a plurality of match text candidates generated by a speech-to-text engine.

DETAILED DESCRIPTION

Figure 1:
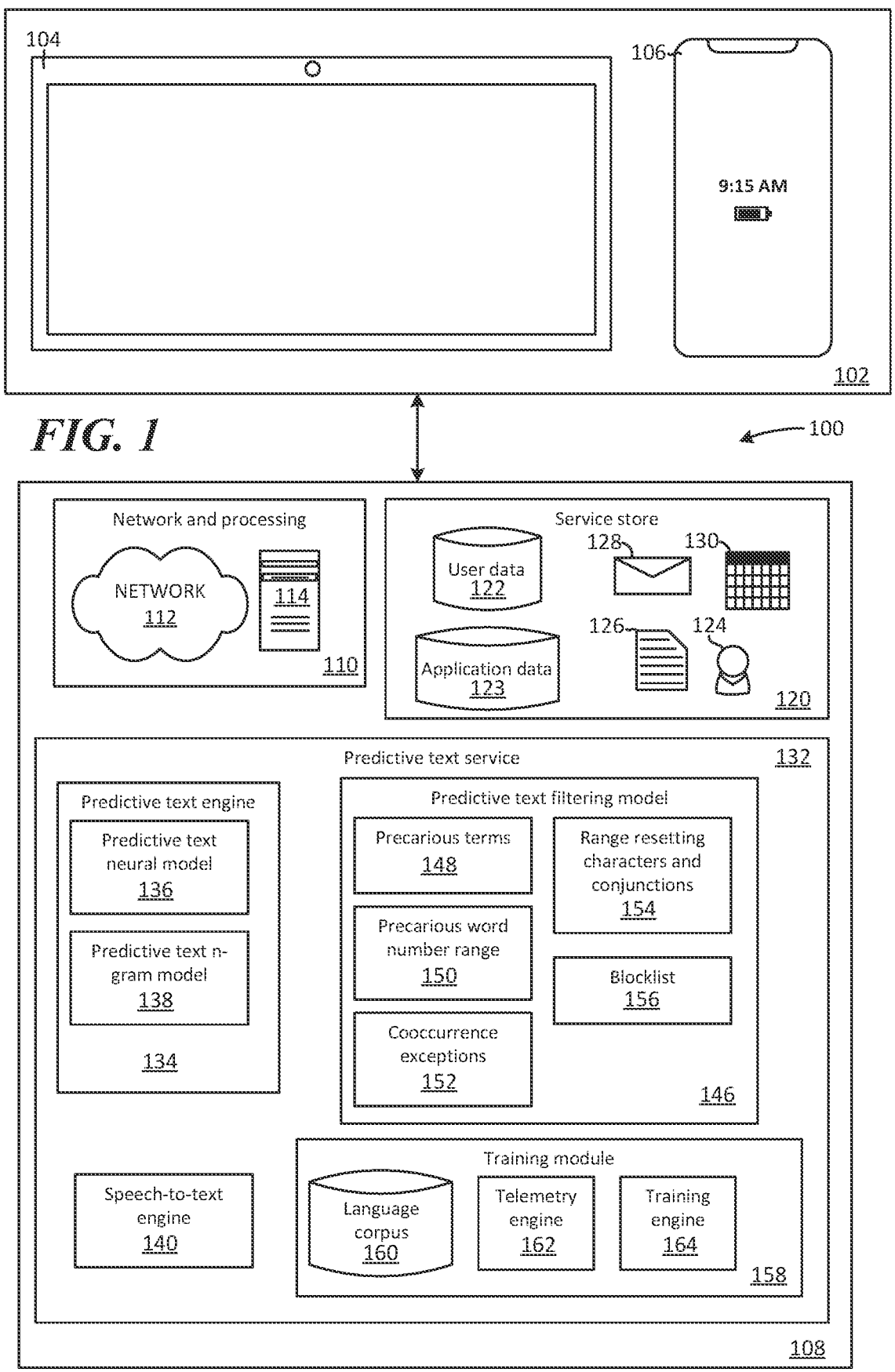
FIG. 1 is a schematic diagram illustrating an example distributed computing environment for filtering predictive text surfacing candidates that include precarious terms.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Examples of the disclosure provide systems, methods, and devices for filtering predictive text surfacing candidates that include precarious terms. As described herein, a "term" comprises one or more words used to describe a thing or to express a concept. A predictive text engine may receive a text input from an electronic surface. The electronic surface may comprise one or more of an application surface, a file, or an operating system shell element. As described herein, an operating system shell, or just "shell", describes a computer interface which exposes an operating system's services to a human user or other programs. It is typically referred to as a shell because it is the outermost layer around the operating system.

In some examples, the text input may be typed or pasted into the electronic surface where it is received. In other examples, the text input may initially be received as a voice input and transformed by a speech-to-text engine to a text format. The predictive text engine may comprise one or more predictive text neural models and/or one or more predictive text n-gram models. The predictive text engine may process the text input and generate or identify one or more surfacing candidates. The surfacing candidates that are generated by the predictive text engine may comprise one or more text characters, words, or punctuation that are determined to have at least a threshold likelihood of being selected by a user for following the text input.

One or more of the surfacing candidates may be received by a predictive text filtering model. The predictive text filtering model may process the surfacing candidates and determine whether they should be filtered from further processing or whether they should be surfaced for completing the text input. The predictive text filtering model may comprise a plurality of terms that are associated in the predictive text filtering model with a precarious classification. In some examples, the precarious terms may be associated with a precarious classification type (e.g., country names, company names, nouns for ethnic groups, nouns for minority groups, nouns for targets of bias, verbs of violence, verbs of touching, and in some examples a miscellaneous classification for terms that do not meet those previously mentioned categorizations yet are still precarious in nature). Other precarious classification types are also contemplated by the systems described herein. The association may comprise a term being tagged (e.g., with metadata) with the classification or being associated with the classification in a relational database. In other examples, precarious terms may not necessarily be tagged or otherwise associated with a specific precarious category type, although they will still be associated with at least a general precarious classification.

In some examples, the plurality of precarious terms may be stored in a storage location comprising a flat file database (e.g., a database that stores data in a plain text format). In other examples, the precarious terms may be stored in a relational database. In some examples, the precarious terms may be manually identified (e.g., by an administrative user) from one or more corpora and added to a precarious term storage location. In other examples, the precarious terms may be automatically identified using one or more embedding models comprised of vectors generated from one or more corpora and added to a precarious term storage location. In additional examples, a combination of manual classification and automatic classification may be utilized to identify precarious terms.

The predictive text filtering model may further comprise a range of a number of words for filtering cooccurrences of precarious terms from the plurality of terms. The range may comprise a rule that is applied by the predictive text filtering model to a surfacing candidate, alone or in combination with a text input, that specifies that if a first precarious term in a surfacing candidate is within a specific number of words from a second precarious term (e.g., less than one word between precarious terms, less than two words between precarious terms, less than three words between precarious terms, less than four words between precarious terms, less than five words between precarious terms) in the surfacing candidate or the text input, the surfacing candidate is to be filtered from being further processed and/or surfaced unless the surfacing candidate meets a cooccurrence exception or there is a range resetting character between the two precarious terms. In additional examples, if a precarious term in a surfacing candidate is within a specific number of words from a blocklist term in the text input, the surfacing candidate may be filtered from being further processed and/or surfaced unless there is a range resetting character between the precarious term and the text input.

The predictive text filtering model may further comprise one or more cooccurrence exceptions to filtering rules. A cooccurrence exception may comprise a rule that is applied by the predictive text filtering model to a surfacing candidate, alone or in combination with a text input, that specifies that if a first precarious term in a surfacing candidate is within a specific number of words from a second precarious term in the surfacing candidate or the text input, that surfacing candidate should nonetheless not be filtered from further processing and/or being surfaced. In some examples, for a cooccurrence exception to apply, the first precarious term may have to be associated with a first specific precarious classification type, and the second precarious term may also have to be of the first specific precarious classification type.

The predictive text filtering model may further comprise one or more range resetting characters or conjunctions that reset the range of the number of words for filtering cooccurrences of precarious terms. Range resetting characters may comprise periods, commas, semi-colons, and/or colons, for example. Range resetting conjunctions may comprise conjunctions including "for", "and", "nor", "but", "or", "yet", and "so", for example.

When the predictive text filtering model receives a surfacing candidate, it may determine whether the surfacing candidate, alone or in combination with the corresponding text input, includes a first precarious term and a second precarious term. If a first precarious term and a second precarious term are identified in the surfacing candidate alone or in combination with the text input, and the first precarious term and the second precarious term are within the precarious word number range of one another (e.g., within one word, within two words, within three words), the surfacing candidate may be blocked from being further processed and/or from being surfaced unless a cooccurrence exception applies or a range resetting character or conjunction is identified between the first term and the second term.

Additional examples provide systems, methods, and devices for applying a heightened degree of scrutiny to match text candidates, generated by speech-to-text engines, that are determined to potentially include offensive language. For example, a text filtering model that is the same or substantially similar to the predictive text filtering model may be applied to match text candidates generated by speech-to-text engines in a variety of scenarios (e.g., voicemail transcription, digital assistant inputs, text transcription). The text filtering model may be applied to match text candidates, and match text candidates that are determined to potentially, or likely, include offensive language based on processing performed by the text filtering model may have to meet a heightened threshold surfacing score to be surfaced compared with match text candidates that are not determined to potentially, or likely, include offensive language based on processing performed by the text filtering model.

Still further examples provide systems, methods and devices for applying a heightened degree of scrutiny to match text candidates generated from handwriting analysis models. For example, a text filtering model that is the same or substantially similar to the predictive text filtering model may be applied to match text candidates generated by handwriting analysis models that have been applied to handwritten text (e.g., handwriting received on a display, handwriting received on a tablet, handwriting received via an image). The text filtering model may be applied to match text candidates, and match text candidates that are determined to potentially, or likely, include offensive language based on processing performed by the text filtering model may have to meet a heightened threshold surfacing score to be surfaced compared with match text candidates that are not determined to potentially, or likely, include offensive language based on processing performed by the text filtering model.

In some examples, potentially offensive match text candidates generated via handwriting analysis models and/or speech-to-text models may be filtered or suppressed based on an egregiousness classification associated with the potentially offensive match text candidates. In some examples, a first egregiousness classification may comprise innocent terms, a second egregiousness classification may comprise sensitive terms (e.g., non-profane terms for body parts, diseases, repulsive terms), a third classification may comprise profane terms (e.g., curse words), and a fourth classification may comprise blocklist terms (e.g., human trafficking terms, incestuous terms, terms for terrorist activities). As such, a threshold for surfacing a match text candidate may correspond to the egregiousness classification. That is, innocent terms may have the lowest surfacing threshold, sensitive terms may have a higher surfacing threshold than innocent terms, profane terms may have a higher surfacing threshold than sensitive terms and innocent terms, and blocklist terms may have the highest threshold. In some examples, blocklist terms may never be surfaced (e.g., there is no threshold associated with them).

In examples, users may have to affirmatively opt in before their data is collected and/or processed by any of the services, engines, models, or stores described herein (e.g., by a predictive text service, by a predictive text engine, by a training module, by a speech-to-text engine). In additional examples, users may affirmatively opt out (e.g., via settings, via an automatically presented menu) from having their data collected and/or processed by any of the services, engines, models, or stores described herein. Additionally, users may delete or correct any of their data that has been collected and/or stored by any of the services, engines, models, or stores described herein. Further, user data that has been collected or stored by any of the services, engines, models, or stores described herein is subject to anonymization and other privacy-preserving practices.

The systems, methods, and devices described herein provide technical advantages for filtering offensive terms from being surfaced as predictive text suggestions. Predictive text neural models are useful in accurately identifying predictive text surfacing candidates. However, due to their neural architecture, predictive text neural models are essentially black boxes which administrative users cannot accurately predict their outputs from. Therefore, while simple blocklists can be applied to surfacing candidates output by predictive text neural models, those blocklists will almost certainly miss a wide variety of offensive surfacing candidates composed of two or more words. The predictive text filtering model described herein provides mechanisms for automatically and accurately identifying and filtering potentially offensive surfacing candidates from being surfaced by predictive text neural models through the classification of precarious terms and application of filtering rules related to those classified precarious terms.

The mechanisms described herein are also technically advantageous in relation to predictive text n-gram models. Typically, with a predictive text n-gram model a developer must go through thousands of lines of code to scrub the model from surfacing offensive surfacing candidates. This process can take developers hundreds or thousands of hours depending on the size of the model and the size of the corpora that the model has been trained on. Alternatively, the predictive text filtering model described herein can automatically and accurately identify and filter potentially offensive surfacing candidates from being surfaced by n-gram models, without manual scrubbing of models.

Another technical advantage of the current solution is that predictive text neural models and n-gram models can be trained on untrusted corpora that may more accurately reflect predictive text intent for users compared with more trusted corpora. For example, while a standard language corpus may not produce as many offensive surfacing candidates and may therefore be considered a trusted source, a corpus comprised of application and service user inputs (e.g., user inputs to a web browser application, user inputs to social media services, user inputs to messaging application) would be much more likely to be useful in accurately predicting language for a user, but would also be much more likely to lead to offensive surfacing candidates if used to train a predictive text model. However, the predictive text filtering model described herein can be used to identify and filter potentially offensive surfacing candidates even with these less trusted corpora because it accurately identifies terms to filter based on precarious classifications and the application of precarious term rules to surfacing candidates after they have been generated by the predictive text models.

FIG. 1 is a schematic diagram illustrating an example distributed computing environment 100 for filtering predictive text surfacing candidates that include precarious terms. Distributed computing environment 100 includes local device sub-environment 102 and application service sub-environment 108. Local device sub-environment 102 includes client computing device 104 and mobile computing device 106. Application service sub-environment 108 includes network and processing sub-environment 110, service store 120, and predictive text service 132.

Network and processing sub-environment 110 includes network 112 and server computing device 114, via which any and all of the computing devices described herein may communicate with one another. Server computing device 114 is illustrative of one or more server computing devices that may host predictive text service 132 and/or service store 120. Although predictive text service 132 and service store 120 are illustrated as being included in in application service sub-environment 108, it should be understood that one or more components of those services (e.g., engines, models, corpuses, files, saved data, application programming interfaces [APIs]) may be stored on and/or executed by one of the local computing devices (e.g., client computing device 104, mobile computing device 106). Similarly, the local computing devices may execute applications associated with one or more of predictive text service 132 and service store 120.

Service store sub-environment 120 may include information associated with predictive text service 132 and/or one or more other applications or services. For example, service store sub-environment 120 may include predictive text filtering user preferences and settings associated with one or more applications, as well as application data associated with one or more applications. User store 122 may be associated with a plurality of user accounts, such as user account 124. User account 124 may have granted predictive text service 132 with access to the user's application data. User account 124 may additionally or alternatively be associated with one or more application services. In this example, user account 124 is associated with an email application service, a word processing application service, and a calendar application service. As such, service store 120 includes electronic messages 128 associated with user account 124, electronic documents 126 associated with user account 124, and electronic calendar information 130 associated with user account 124. User data store may include additional information from one or more other applications or services, such as SMS messaging applications or services, group messaging/collaboration applications or services, social media applications or services, web browser applications or services, task management applications or services, to-do list applications or services, map applications or services, reservation applications or services, game applications or services, note taking applications or services, presentation applications or services, and spreadsheet applications or services, for example. In some examples, user data store 122 may include information for user accounts associated with predictive text service 132.

Predictive text service 132 includes predictive text engine 134, speech-to-text engine 140, predictive text filtering model 146, and training module 158.

Predictive text engine 134 includes predictive text neural model 136 and predictive text n-gram model 138. Predictive text neural model 136 is illustrative of one or more neural network models that may receive a text input from an electronic surface (e.g., an application surface, a service surface, an operating system shell surface, a file surface) and generate one or more surfacing candidates based on processing the text input with the one or more neural network models. The surfacing candidates that are generated by predictive text neural model 136 may comprise one or more text characters, words, or punctuation that are determined to have at least a threshold likelihood of being selected by a user for following the text input. Examples of neural models that predictive text neural model 136 may encompass include Generative Pre-Trained Transformers (GPT) (e.g., GPT2, GPT3), Bidirectional Encoder Representations from Transformers (BERT), Embeddings from Language Models (ELMo), and/or Recurrent Neural Networks (RNN).

Predictive text n-gram model 138 is illustrative of one or more n-gram models that may receive a text input from an electronic surface and generate one or more surfacing candidates based on processing the text input with the one or more n-gram models (e.g., 2-gram, 3-gram, 4-gram). The surfacing candidates that are generated by predictive text n-gram model 138 may comprise one or more text characters, words, or punctuation that are determined to have at least a threshold likelihood of being selected by a user for following the text input.

The likelihood that a generated surfacing candidate may be selected by a user following the processed text input, as determined by predictive text neural model 136 or predictive text n-gram model 138, may correspond to a specific user account (e.g., predictive text neural model 136 or predictive text n-gram model 138 was trained on a corpus that includes text data from that user account) that entered the text input that is processed by predictive text engine 134, or the likelihood that a generated surfacing candidate may be selected may correspond to a plurality of user accounts (e.g., predictive text neural model 136 or predictive text n-gram model 138 was trained on a corpus that includes text data from a plurality of user accounts and/or one or more general language corpus). In some examples, the likelihood that a generated surfacing candidate may be selected may correspond to user-specific data and data from one or more other user accounts.

In some examples, speech-to-text engine 140 may receive a speech audio input (e.g., from a microphone associated with client computing device 104 or mobile computing device 106) and transform that speech audio input to text. The text may then be provided to predictive text engine 134 for processing. Speech-to-text engine 140 may comprise one or more neural networks (e.g., Long Short-Term Memory [LSTM] models, RNN models, Time Delay Neural Network [TDNN] models, Hidden Markov models, dynamic time warping models, and/or end-to-end models) that have been trained to transform speech audio input to text.

The text input that is processed by predictive text engine 134 may be initially received by an application executed all or in part by one of the local computing devices (e.g., client computing device 104, mobile computing device 106). In some examples, the application may be installed locally on one of the local computing devices. In other examples, the application may be a cloud-based application that is accessed by one of the local computing devices via network 112. In other examples, the text input that is processed by predictive text engine 134 may be initially received by an operating system shell element executed by one of the local computing devices. In additional examples, the text input that is processed by predictive text engine 134 may be initially received by a digital assistant executed by one of the local computing devices, or a cloud-based digital assistant. In some examples, the text input may be communicated to the predictive text service 132 via one or more APIs.

Predictive text engine 134 may provide predictive text filtering model 146 with one or more surfacing candidates that meet a threshold likelihood of being selected by a user for following a processed text input. Predictive text filtering model 146 includes precarious terms 148, precarious word number range 150, cooccurrence exceptions 152, range resetting characters and conjunctions 154, and blocklist 156. Precarious word number range 150, cooccurrence exceptions 152, range resetting characters and conjunctions 154, and/or blocklist 156 may comprise a plurality of rules that are applied during the processing of a surfacing candidate. Predictive text filtering model 146 may process the one or more surfacing candidates provided to it by predictive text engine 134 and determine whether they should be filtered based on including one or more precarious terms.

Precarious terms 148 comprises a plurality of terms that have been classified as being precarious in type. Although precarious terms 148 may not necessarily be tagged or otherwise associated with precarious category types, in some examples precarious terms 148 may be identified and added to a precarious term storage location based on having a precarious category type. Precarious category types may include country names (e.g., United States, China, Armenia), company names (e.g., Microsoft, LinkedIn), nouns for ethnic groups (e.g., an African, African people, Middle Easterner, a South American, Brazilian woman, Canadian men, Jewish people, Arabic men), nouns for minority groups (e.g., black people, Mexican men, Asian women), nouns for targets of bias (e.g., homosexuals, gay people, transgender people, old people, women), verbs of violence (e.g., abuse, assault, coerce, demean, dominate, enslave, force, humiliate), verbs of touching (e.g., bang, bite, expose, finger, flash, insert), and in some examples a miscellaneous classification into which terms that do not meet those previously mentioned categorizations, yet are still precarious in nature, may be classified. Examples of terms that may be included in the miscellaneous classification category type include dangerous terms (e.g., anarchist, captor), minor terms (e.g., girl, boy, child, cutie), and illegal terms (e.g., forbidden, illegal, taboo, undercover, underground).

In some examples, the precarious term storage location where precarious terms 148 are stored may comprise a flat file database (e.g., a database that stores data in a plain text format). In other examples, the precarious term storage location where precarious terms 148 are stored may comprise a relational database. In other examples, the precarious term storage location where precarious terms 148 are stored may comprise a binary trie format. In some examples, precarious terms 148 may be manually identified (e.g., by an administrative user) from one or more corpora and added to a precarious term storage location. In other examples, precarious terms 148 may be automatically identified using one or more embedding models (e.g., sent-2-vec, ELMo, BERT) comprised of vectors generated from one or more corpora, and added to a precarious term storage location. In additional examples, a combination of manual classification and automatic classification may be utilized to identify terms that are added to precarious terms 148 (e.g., added to a precarious term storage location).

Precarious word number range 150 comprises a range of a number of words for filtering cooccurrences of precarious terms from the plurality of terms. Precarious word number range 150 may comprise a rule that is applied by predictive text filtering model 146 to a surfacing candidate, alone or in combination with a text input, that specifies that if a first precarious term in a surfacing candidate is within a specific number of words from a second precarious term (e.g., less than one word between precarious terms, less than two words between precarious terms, less than three words between precarious terms, less than four words between precarious terms, less than five words between precarious terms) in the surfacing candidate or the text input, the surfacing candidate is to be filtered from being surfaced unless the surfacing candidate meets a cooccurrence exception or there is a range resetting character or conjunction between the two precarious terms. In additional examples, precarious word number range 150 may comprise a rule that is applied by predictive text filtering model 146 to a surfacing candidate, alone or in combination with a text input, that specifies that if a precarious term in a surfacing candidate is within a specific number of words from a blocklist term (e.g., less than one word between a precarious term and a blocklist term, less than two words between a precarious term and a blocklist term, less than three words between a precarious term and a blocklist term, less than four words between a precarious term and a blocklist term, less than five words between a precarious term and a blocklist term) in the text input, the surfacing candidate is to be filtered from being surfaced unless there is a range resetting character or conjunction between the precarious term and the blocklist term.

Cooccurrence exceptions 152 comprise one or more exceptions that predictive text filtering model 146 may apply to keep a surfacing candidate that would otherwise be filtered based on including one or more precarious terms 148 alone or in combination with a text input that includes one or more precarious or blocklist terms. Cooccurrence exceptions 152 may comprise one or more rules that are applied by predictive text filtering model 146 to a surfacing candidate, alone or in combination with a text input, that specify that if a first precarious term in a surfacing candidate is within a specific number of words from a second precarious term or blocklist term in the surfacing candidate or the text input, that surfacing candidate should nonetheless not be filtered from being surfaced. For example, cooccurrence exceptions 152 may comprise rules that precarious terms that are of a country name type, a company name type, a nouns for ethnic groups type, and/or a nouns for minority groups type may be included next to one another or within a specific range number of one another, and not be filtered despite not meeting the criteria of precarious word number range 150. As a specific example, a first cooccurrence exception may dictate that terms of a country name type are not be filtered even if they are directly next to one another in a surfacing candidate. In another specific example, a second cooccurrence exception may dictate that terms of a company name type are not be filtered even if they are directly next to one another in a surfacing candidate.

Range resetting characters and conjunctions 154 comprise punctuation characters or conjunctions that reset the range of the number of words for filtering cooccurrences of precarious terms. Range resetting characters and conjunctions 154 may comprise periods, commas, semi-colons, colons, and/or conjunctions (e.g., "and", "or", "nor", "yet") for example. As an example, if precarious word number range 150 comprises one word (e.g., surfacing candidates will be filtered if they include, alone or in combination with a text input, a first precarious term followed by a non-precarious word, followed by a precarious term), but there is an intervening period (corresponding to a range resetting character) between a first precarious term and a second precarious term in a surfacing candidate, alone or in combination with a text input, the surfacing candidate may nonetheless be surfaced (e.g., not filtered).

Thus, where periods are included in range resetting characters and conjunctions 154, and precarious word number range 150 comprises one word, the following surfacing candidates would not be filtered, where the bold text corresponds to the surfacing candidates and the non-bold text corresponds to the text input.

[non-precarious word A] [precarious term B]. [non-precarious term C] [precarious term D]

[non-precarious word A] [precarious term B]. [precarious term C] [non-precarious term D]

[non-precarious word A] [non-precarious word B] [precarious term C]. [precarious term D]

[non-precarious word A] [non-precarious word B] [precarious term C] [non-precarious word D]. [precarious term E]

Blocklist 156 comprises one or more words or terms that may cause surfacing candidates that include one or more of the words or terms in blocklist 156 to be filtered out (e.g., blocked from being surfaced, blocked from being further processed) regardless of any rule, exception, or range resetting character or conjunction included in predictive text filtering model 146. Blocklist 156 may comprise a manually or automatically generated list (e.g., stored in a flat file, stored in a relational database) of words or terms. Although blocklist 156 is illustrated in this example as being included in predictive text filtering model 146, a blocklist may additionally or alternatively be applied by predictive text engine 134. For example, a blocklist may be applied by predictive text engine 134, which would automatically filter out surfacing candidates generated by predictive text engine 134 that include a word or term included in the blocklist from being sent to predictive text filtering model 146.

Training module 158 includes language corpus 160, telemetry engine 162, and training engine 164. Language corpus 160 may comprise one or more corpora that predictive text engine 134 and/or predictive text filtering model may be trained on. Language corpus 160 may also be utilized to identify precarious terms 148 and/or words and terms in blocklist 156 via manual classification and/or automatic classification. Language corpus 160 may comprise a corpus that is comprised of words, sentences, or sentence fragments that are specific to a user account (e.g., they were generated by user account 124). Language corpus 160 may additionally or alternatively be comprised of words, sentences, or sentence fragments that are not specific to a user account (e.g., American National Corpus, International Corpus of English, German Reference Corpus, Corpus Inscriptionum Semiticarum). In additional examples, language corpus 160 may comprise one or more domain specific corpora (science specific corpora, accounting specific corpora, legal specific corpora). In some examples, language corpus 160 may be generated from scraping of the Internet or from user data which has been scrubbed of personal content and metadata.

Telemetry engine 162 may request and/or receive feedback related to surfaced predictive text (e.g., a displayed surfacing candidate, an audibly produced surfacing candidate). For example, when presented with one or more surfacing candidates, a user may provide feedback (e.g., via voice input, via one or more user interface elements) to telemetry engine 162 indicating that one or more of the surfaced candidates is inappropriate (e.g., contains offensive text, is not helpful). In some examples, the feedback may be manually reviewed (e.g., by a developer) and one or more words or terms included in surfacing candidates that feedback has been received on may be added or removed from precarious terms 148 and/or blocklist 156. In other examples, the feedback may be automatically processed by predictive text service 132, and one or more words or terms included in surfacing candidates that feedback has been received on may be automatically added or removed from precarious terms 148 and/or blocklist 156. In examples, for a word or term to be automatically added to or removed from precarious terms 148 and/or blocklist 156, a threshold number of users may have to have provided a same type of feedback (e.g., positive feedback, negative feedback) related to the word or term. In other examples, precarious terms 148 and/or blocklist 156 may only be updated via manual intervention (e.g., by a developer of predictive text filtering model 146).

Training engine 164 may receive feedback related to surfaced predictive text. The feedback may be received directly from a user device (e.g., client computing device 104, mobile computing device 106), or the feedback may be received from telemetry engine 162. Training engine 164 may use the feedback to train and update one or more models included in predictive text engine 134 and/or speech-to-text engine 140.

Figure 2:
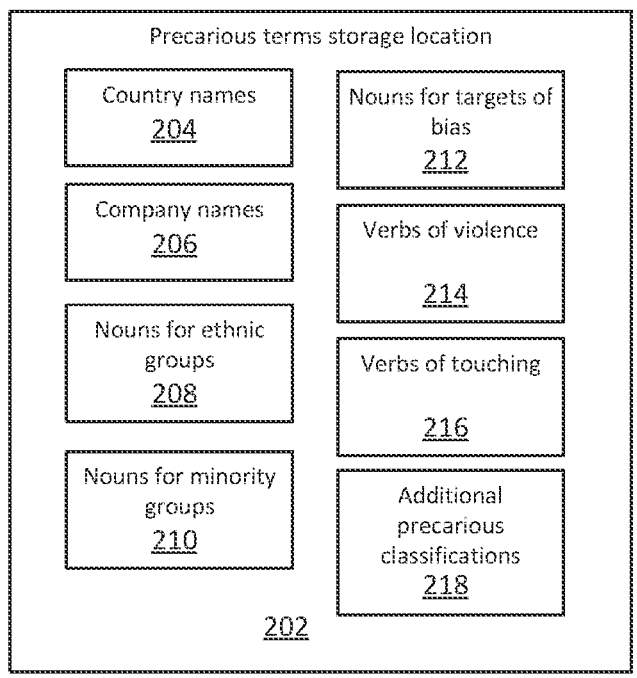
FIG. 2 is a block diagram illustrating precarious term types that may be used to filter predictive text surfacing candidates.

FIG. 2 is a block diagram 200 illustrating precarious term types that may be used to filter predictive text surfacing candidates. Block diagram 200 includes precarious terms storage location 202. Precarious terms storage location 202 may comprise a flat file database (e.g., a database that stores data in a plain text format), or a relational database. Precarious terms storage location 202 includes a plurality of precarious terms, where each of the precarious terms corresponds to, but is not necessarily tagged with or otherwise associated with (e.g., with metadata, in a column or row of precarious terms storage location 202) a precarious classification type. In some examples, precarious terms may be manually identified (e.g., by an administrative user) from one or more corpora and added to precarious terms storage location 202. In other examples, precarious terms may be automatically identified using one or more embedding models (e.g., sent-2-vec, ELMo, BERT) comprised of vectors generated from one or more corpora, and added to precarious term storage location 202. In additional examples, a combination of manual classification and automatic classification may be utilized to identify terms that are added to precarious terms 148 (e.g., added to a precarious term storage location).

The precarious classification types included in precarious terms storage location 202 include country names 204, company names 206, nouns for ethnic groups 208, nouns for minority groups 210, nouns for targets of bias 212, verbs of violence 214, verbs of touching 216, and additional precarious classifications 218. Additional precarious classifications 218 correspond to terms that do not correspond to the other precarious classification types included in precarious terms storage location 202 yet are still precarious in nature. For example, additional precarious classifications 218 may include precarious classes of people (e.g., children, political parties, religions), objects (e.g., weapons, prescription drugs, gambling terms), insults, words for images, diseases, and words for evoking disgust.

Figure 3:
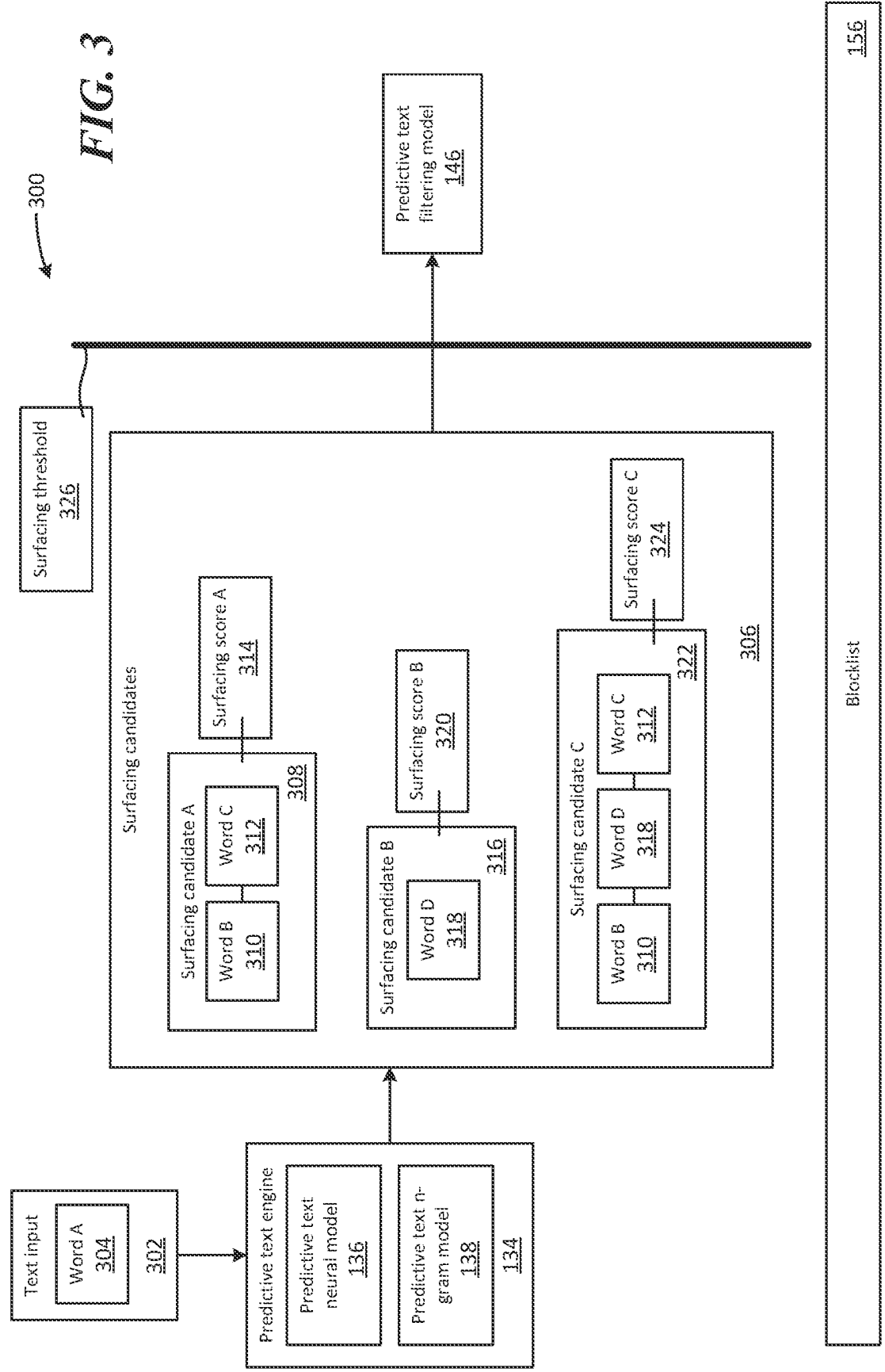
FIG. 3 is a block diagram illustrating the generation of surfacing candidates by a predictive text engine prior to their processing with a predictive text filtering model.

FIG. 3 is a block diagram 300 illustrating the generation of surfacing candidates by a predictive text engine prior to their processing with a predictive text filtering model. Block diagram 300 includes text input 302, predictive text engine 134, surfacing candidates 306, surfacing threshold 326, predictive text filtering model 146, and blocklist 156.

Text input 302 includes at least one word. In this example, text input includes word A 304. Text input 302 may be received by an electronic surface. In some examples, text input 302 may have been initially received in an audio format and transformed to text (e.g., via speech-to-text engine 140).

Text input 302 is provided to predictive text engine 134. In some examples, predictive text engine 134 may be applied to any text input in the application, service, operating system shell element, or file where text input 302 was received. In additional examples, settings associated with a user account may be selectable for determining which applications, services, operating system shell elements, or files predictive text engine 134 may process text for. As described in relation to FIG. 1, predictive text engine may process text input 302 with predictive text neural model 136 and/or predictive text n-gram model 138.

Predictive text engine 134 determines a plurality of surfacing candidates 306 based on its processing of text input 302. In this example, surfacing candidates 306 includes surfacing candidate A 308, which includes word B 310 followed by word C 312; surfacing candidate B 316, which includes word D 318; and surfacing candidate C, which includes word B 310, followed by word D 318, followed by word C 312. Predictive text engine 134 has also determined and assigned a surfacing score to each of surfacing candidates 306. Those scores are surfacing score A 314 for surfacing candidate A 308, surfacing score B 320 for surfacing candidate B 316, and surfacing score 324 for surfacing candidate C 322.

The surfacing score for each surfacing candidate may correspond to a likelihood of that surfacing candidate being selected by a user. In the case of predictive text neural model 136, a surfacing score for a surfacing candidate may be determined based at least on an embedding value for the surfacing candidate in relation to text input 302. In the case of predictive text n-gram model 138, the surfacing score for a surfacing candidate may be determined based at least on a frequency of the n-gram corresponding to the surfacing candidate in one or more corpora used to train predictive text n-gram model 138 and/or how closely the surfacing candidate matches the user input (e.g., in the case of handwriting).

Upon generating surfacing candidates 306 and their corresponding surfacing scores, predictive text service 132 may determine whether a surfacing score for each of surfacing candidates 306 is above or below a surfacing threshold value, which is illustrated by surfacing threshold 326. Any surfacing candidates that have surfacing scores below surfacing threshold 326 may be filtered from further processing (e.g., processing by predictive text filtering model 146). Any surfacing candidates that have surfacing scores above surfacing threshold 326 may be further processed (e.g., by predictive text filtering model 146).

Blocklist 156 is illustrated as spanning predictive text engine 134 and predictive text filtering model 146. This is the case because one or more blocklist may be applied by predictive text engine 134 and/or by predictive text filtering model 146. A blocklist applied by predictive text engine 134 may be the same blocklist or a different blocklist as applied by predictive text filtering model 146. In applying blocklist 156 by predictive text engine 134, one or more surfacing candidates may have been filtered from further processing despite having surfacing scores that exceed surfacing threshold 326, based on those one or more surfacing candidates including a word or term included in blocklist 156.

Figure 4:
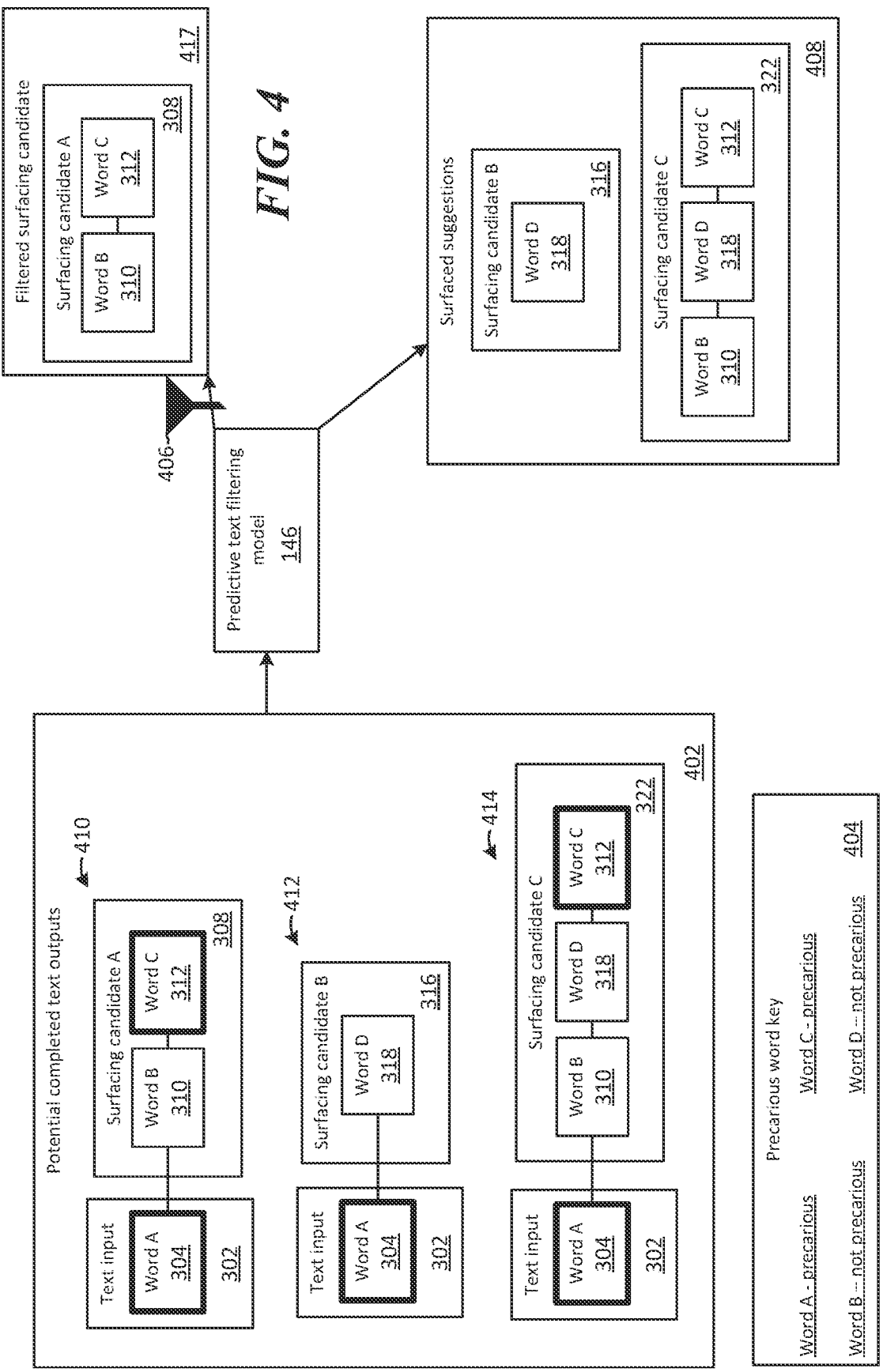
FIG. 4 is a block diagram illustrating the processing of the surfacing candidates generated in FIG. 3, in combination with a text input that includes a precarious term, with a predictive text filtering model.

FIG. 4 is a block diagram 400 illustrating the processing of the surfacing candidates generated in FIG. 3, in combination with a text input that includes a precarious term, with a predictive text filtering model. Block diagram 400 includes potential completed text inputs 402, predictive text filtering model 146, filter 406, filtered surfacing candidate 417, surfaced suggestions 408, and precarious word key 404.

Precarious word key 404 indicates the words in potential completed text outputs 402 that are precarious. That is, precarious word key 404 indicates words that are included in precarious terms storage location 202. Specifically, precarious word key 404 indicates that word A 304 is a precarious word, word B 310 is not a precarious word, word C 312 is a precarious word, and word D 318 is not a precarious word. Although in this example individual words are indicated as being precarious or not precarious, it should be understood that the entries included in precarious terms storage location 202 correspond to terms, which may include one or more words. For example, the term "United States" is a country name and therefore would be included in precarious terms storage location 202. Similarly, the term "African American" is a noun for a minority group and therefore would be included in precarious terms storage location 202. The words that are included in precarious terms storage location 202 are also illustrated in FIG. 4 as being associated with a precarious type by having bold outline in potential completed text outputs 402.

In the illustrated example, the surfacing scores for each of surfacing candidate A 308, surfacing candidate B 316, and surfacing candidate C 322 were determined to be above surfacing threshold 326. As such, each of those surfacing candidates are processed with predictive text filtering model 146. Surfacing candidates 306 are joined with text input 302 such that the entirety of a potential text string that would be generated via the addition of text input 302 and each of the surfacing candidates 306 may be processed by predictive text filtering model 146. Thus, predictive text filtering model 146 processes each of potential completed text outputs 402. Potential completed text outputs 402 include first potential completed text output 410, which comprises text input 302 and surfacing candidate A 308; second potential completed text output 412, which comprises text input 302 and surfacing candidate B 316; and third potential completed text output 414, which comprises text input 302 and surfacing candidate C 322.

In this example, precarious word number range 150 is two words. Thus, if there are less than two words between a first precarious term and a second precarious term, and no exceptions apply, the surfacing candidate will be filtered. As such, predictive text filtering model 146, and filter 406, filter out surfacing candidate A 308, as indicated by filtered surfacing candidate 417. This is the case because when joined with text input 302, as illustrated by first potential completed text output 410, word A 304 (which is identified as being precarious) is only word away from word C 312 (which is also identified as being precarious). Similarly, if word A 304 were a blocklist word, surfacing candidate A 308 would still have been filtered out.

Alternatively, neither of second potential completed text output 412 or third potential completed output 414 include precarious words or terms that are less than two words apart. As such, one or both of surfacing candidate B 316, which is included in second potential text output 412, and surfacing candidate C 322, which is included in third potential completed output 414, may be caused to be surfaced.

Predictive text filtering model 146 may cause surfacing candidates to be surfaced in various forms. In some examples, those forms may be dependent on the application, service, file, or operating system shell element that a surfacing candidate is surfaced in. For example, predictive text filtering model 146 may cause one or more surfacing candidates that are not filtered out by predictive text filtering model 146 to be displayed in an application user interface or an operating system shell element that includes the text input that was processed to determine the surfacing candidates. In some examples, the one or more surfacing candidates may be selectable (e.g., via mouse click, via keyboard input, via touch input, via voice input) for inserting a corresponding surfacing candidate into the application user interface or operating system shell element that includes the text input. In additional examples, predictive text filtering model 146 may cause one or more surfacing candidates that are not filtered out by predictive text filtering model 146 to be audibly produced via one or more speakers associated with a computing device that the text input that was processed to determine the surfacing candidates was input on. A user may then select (e.g., via mouse click on an accessibility UI element, via keyboard input, via touch input on an accessibility UI element, via voice input) one or more of the surfacing candidates that are not filtered out by predictive text filtering model 146 for inserting into the application user interface or operating system shell element that includes the text input.

Figure 5:
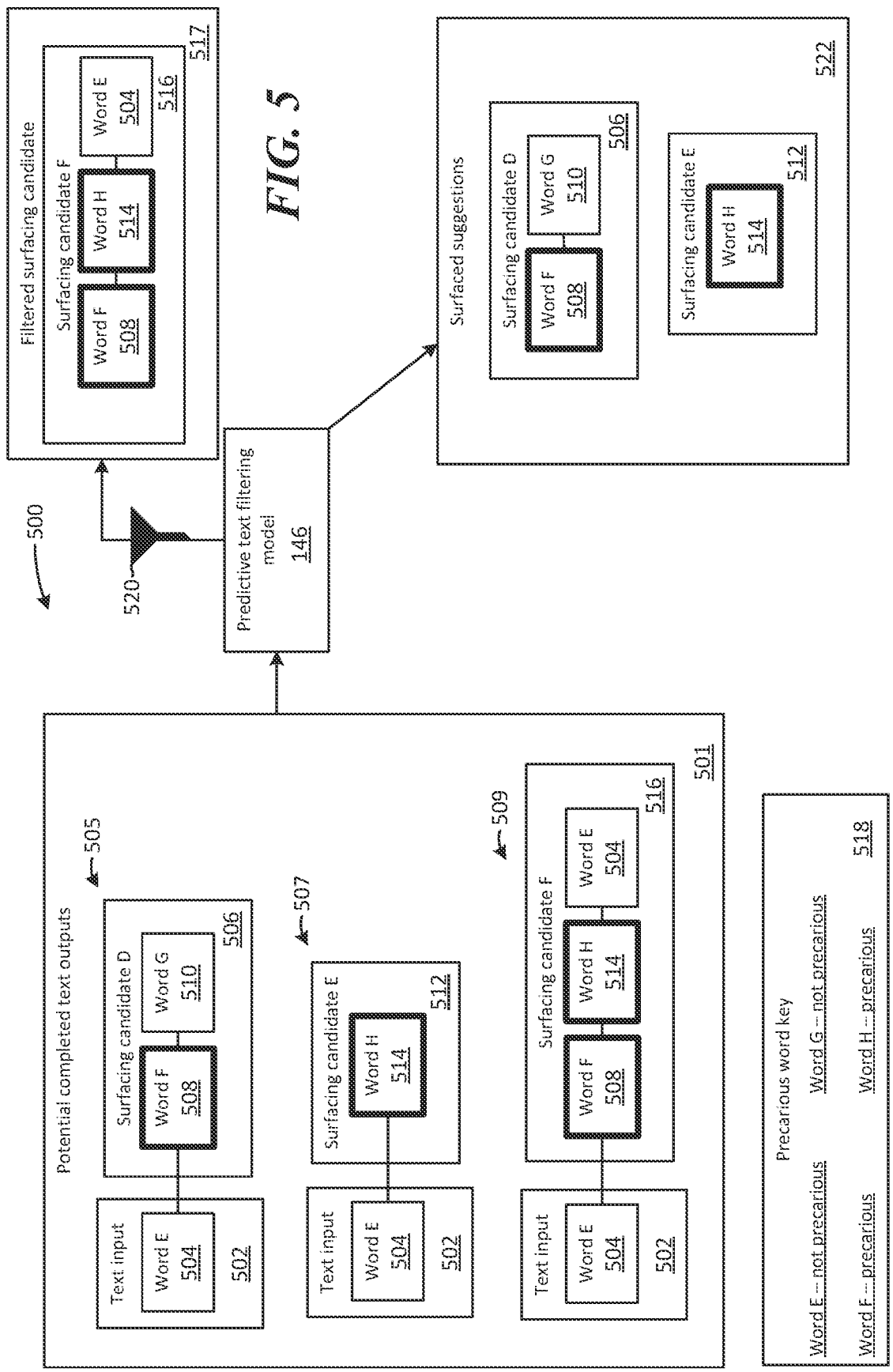
FIG. 5 is a block diagram illustrating the processing of surfacing candidates, in combination with a text input that does not include a precarious term, with a predictive text filtering model.

FIG. 5 is a block diagram 500 illustrating the processing of surfacing candidates, in combination with a text input that does not include a precarious term, with a predictive text filtering model. In this example, the surfacing candidates comprise different words than the surfacing candidates discussed above in FIGS. 3-4. Similarly, text input 502 is different than text input 302. That is, text input 502 comprises word E 504 and text input 302 comprises word A 304. Block diagram 500 includes potential completed text inputs 501, predictive text filtering model 146, filtered surfacing candidate 517, surfaced suggestions 522, and precarious word key 518.

Precarious word key 518 indicates the words in potential completed text outputs 501 that are precarious. That is, precarious word key 518 indicates words that are included in precarious terms storage location 202. Specifically, precarious word key 518 indicates that word E 504 is not a precarious word, word F 508 is a precarious word, word G 510 is not a precarious word, and word H 514 is a precarious word. Although in this example individual words are indicated as being precarious or not precarious, it should be understood that the entries included in precarious terms storage location 202 correspond to terms, which may include one or more words. The words that are included in precarious terms storage location 202 are also illustrated in FIG. 5 as being associated with a precarious type by having bold outline in potential completed text outputs 501.

In the illustrated example, the surfacing scores for each of surfacing candidate D 506, surfacing candidate E 512, and surfacing candidate F 516 have been determined to be above surfacing threshold 326. As such, each of those surfacing candidates are processed with predictive text filtering model 146. Those surfacing candidates are joined with text input 502 such that the entirety of a potential text string that would be generated via the addition of text input 502 and each of the surfacing candidates may be processed by predictive text filtering model 146. Although in this example text input 502 includes a single word it should be understood that text input 502 may comprise a plurality of words.

Predictive text filtering model 146 processes each of potential completed text outputs 501. Potential completed text outputs 501 include first potential completed text output 505, which comprises text input 502 and surfacing candidate D 506; second potential completed text output 507, which comprises text input 502 and surfacing candidate E 512; and third potential completed text output 509, which comprises text input 502 and surfacing candidate F 516.

In this example, precarious word number range 150 is two words. Thus, if there are less than two words between a first precarious term and a second precarious term, and no exceptions apply, the surfacing candidate will be filtered. As such, predictive text filtering model 146 and filter 520 filter out surfacing candidate F 516, as indicated by filtered surfacing candidate 517. This is the case because, despite text input 502 not including a precarious term, surfacing candidate F 516 includes a first precarious word (word F 508) and a second precarious word (word H 514), which are less than two words apart from one another (e.g., they are within precarious word range 150).

Alternatively, neither of first potential completed text output 505 or second potential completed output 507 include precarious words or terms that are less than two words apart. As such, one or both of surfacing candidate D 506, which is included in first potential completed text output 505, and surfacing candidate E 512, which is included in second potential completed output 507, may be caused to be surfaced.

Predictive text filtering model 146 may cause surfacing candidates to be surfaced in various forms. In some examples, those forms may be dependent on the application, service, file, and/or or operating system shell element that a surfacing candidate is surfaced in. For example, predictive text filtering model 146 may cause one or more surfacing candidates that are not filtered out by predictive text filtering model 146 to be displayed in an application user interface or an operating system shell element that includes the text input that was processed to determine the surfacing candidates. In some examples, the one or more surfacing candidates may be selectable (e.g., via mouse click, via keyboard input, via touch input, via voice input) for inserting a corresponding surfacing candidate into the application user interface or operating system shell element that includes the text input. In additional examples, predictive text filtering model 146 may cause one or more surfacing candidates that are not filtered out by predictive text filtering model 146 to be audibly produced via one or more speakers associated with a computing device that the text input that was processed to determine the surfacing candidates was input on. A user may then select (e.g., via mouse click on an accessibility UI element, via keyboard input, via touch input on an accessibility UI element, via voice input) the one of the surfacing candidates that are not filtered out by predictive text filtering model 146 for inserting into the application user interface or operating system shell element that includes the text input.

Figure 6:
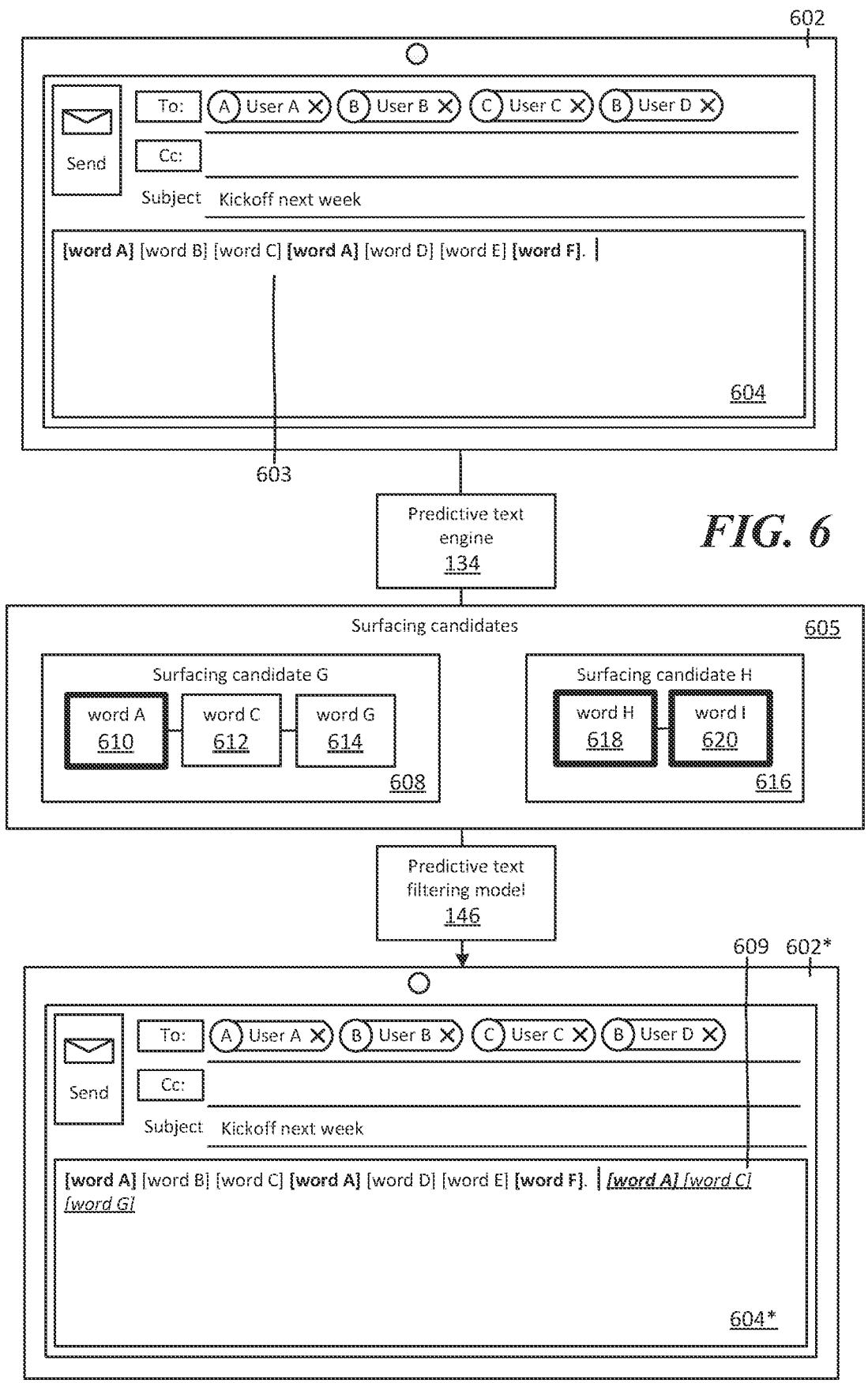
FIG. 6 illustrates a first exemplary user interface for receiving a text input that is utilized to generate surfacing candidates by a predictive text engine, and a second exemplary user interface displaying a surfacing candidate that was not filtered by a predictive text filtering model.

FIG. 6 illustrates a first exemplary user interface 604 for receiving a text input 603 that is utilized to generate surfacing candidates 605 by a predictive text engine 134, and a second exemplary user interface 604* displaying a surfacing candidate that was not filtered by a predictive text filtering model 146.

First exemplary user interface 604 is displayed on computing device 602, which is the same computing device as computing device 602*. However, first exemplary user interface 604 displays content prior to processing performed by predictive text filtering model 146. Specifically, first user interface 604 is an email application user interface that a user is drafting an email on to User A, User B, User C and User D, with the subject "Kickoff next week". The body of the email includes text input 603, which states [word A] [word B] [word C] [word A] [word D] [Word E] [word F], and is followed with a period. In this example, for ease of illustration, the words that are precarious (e.g., included in precarious terms storage location 202) are bolded. That is, [word A] and [word F] in text input 603 are precarious words.

Predictive text engine 134 processes text input 603 (e.g., with predictive text neural model 136, with predictive text n-gram model 138) and determines that there are two surfacing candidates that have a threshold surfacing score that exceeds a threshold surfacing value (e.g., surfacing threshold 326). Those surfacing candidates 605 are surfacing candidate G 608 and surfacing candidate H 616. Surfacing candidate G 608 comprises word A, followed by word C 612, followed by word G 614. Surfacing candidate H 616 comprises word H 618 followed by word I 620. As noted above, word A 610 is a precarious word. The bolding around word H 618 and word I 620 illustrates in this example that those words are also precarious (e.g., included in precarious terms storage location 202).

In this example, precarious word number range 150 is two words. As such, without an exception, that rule would dictate that both of surfacing candidate G 608 and surfacing candidate 616 be filtered from being surfaced. For example, word F (which is precarious) in text input 603 would be less than two words away from word A 610 (which is precarious) if surfacing candidate G 608 was inserted after text input 603. Similarly, word F (which is precarious) in text input 603 would be less than two words away from both word H 618 (which is precarious) and word I 620 (which is precarious) if surfacing candidate H 616 was inserted after text input 603. However, in this example range resetting characters and conjunctions 154 for predictive text filtering model 146 includes a rule that periods reset precarious word number range 150. As such, surfacing candidate G 608 is not filtered from being surfaced because the period after word F in text input 603 resets precarious word number range 150. However, predictive text filtering model 146 filters surfacing candidate H 616 from being surfaced because surfacing candidate H 616 includes two terms (in this case words) that are within precarious word number range 150. That is, in this example, word H 618 and word I 620 in surfacing candidate H 616 are directly next to one another (there are less than two words between precarious word H 618 and precarious word I 620, which meets the rule corresponding to precarious word number range 150), and there are no range resetting characters and conjunctions 154 between them or cooccurrence exceptions 152 that apply to them. As such, surfacing candidate H 616 is filtered from being surfaced by predictive text filtering model 146.

Surfacing candidate G 608 was not filtered by predictive text filtering model 146 and it is therefore caused to be displayed on application user interface 604* on computing device 602*, as indicated by selectable surfacing candidate element 609. Selectable surfacing candidate element 609 may be interacted with (e.g., via mouse click, via touch input, via voice input, via keyboard input) for causing surfacing candidate 608 to be inserted after text input 603. Although in this example only a single non-filtered surfacing candidate is surfaced for selection, it should be understood that in examples where more than one surfacing candidate is not filtered by predictive text filtering model 146, a plurality of non-filtered surfacing candidates may be surfaced for selection by a user and subsequent insertion after a processed text input.

Figure 7A:
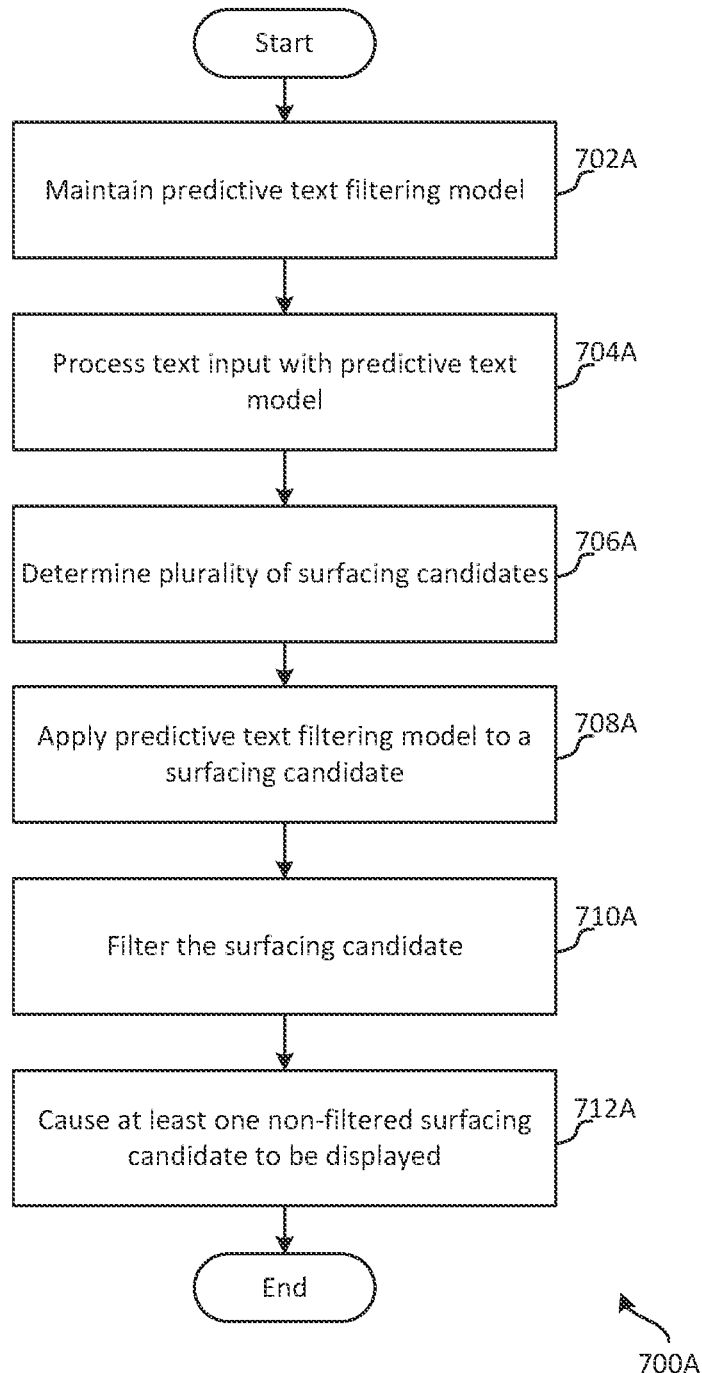
FIG. 7A is an exemplary method for assisting with filtering predictive text surfacing candidates.

FIG. 7A is an exemplary method for assisting with filtering predictive text surfacing candidates. The method 700A begins at a start operation and flow moves to operation 702A.

At operation 702A a predictive text filtering model is maintained. The predictive text filtering model may comprise a plurality of terms that are associated in the predictive text filtering model with a precarious classification. In some examples, the precarious terms may be associated with a precarious classification type (e.g., country names, company names, nouns for ethnic groups, nouns for minority groups, nouns for targets of bias, verbs of violence, verbs of touching, and in some examples a miscellaneous classification for terms that do not meet those previously mentioned categorizations yet are still precarious in nature). The association may comprise being tagged (e.g., with metadata) with the classification or being associated with the classification in a relational database, for example. In other examples, the precarious terms may not necessarily be tagged or otherwise associated with a precarious category type. In some examples, the plurality of terms may be stored in a storage location comprising a flat file database (e.g., a database that stores data in a plain text format). In other examples, the precarious terms may be stored in a relational database or a binary trie format. In some examples, the precarious terms may be manually identified (e.g., by an administrative user) from one or more corpus and added to a precarious term storage location. In other examples, the precarious terms may be automatically identified using one or more embedding models (e.g., sent-2-vec, ELMo, BERT) comprised of vectors generated from one or more corpus, and added to a precarious term storage location. In additional examples, a combination of manual classification and automatic classification may be utilized to identify precarious terms.

The predictive text filtering model may further comprise a range of a number of words for filtering cooccurrences of precarious terms from the plurality of terms. The range may comprise a rule that is applied by the predictive text filtering model to a surfacing candidate, alone or in combination with a text input, that specifies that if a first precarious term in a surfacing candidate is within a specific number of words from a second precarious term in the surfacing candidate or the text input, the surfacing candidate is to be filtered from being surfaced unless the surfacing candidate meets a cooccurrence exception or there is a range resetting character or conjunction between the two precarious terms.

From operation 702A flow continues to operation 704A where a text input is processed with a predictive text model. The text input may comprise one or more text strings (e.g., text characters, words, sentences). The text input may be received by the predictive text model from an electronic surface accessed by a computing device. In some examples, the text input may initially be received in an audio format and transformed to a text input with a speech-to-text engine.

The predictive text model may comprise one or more predictive text neural models and/or one or more predictive text n-gram models. A predictive text neural model may comprise a neural network that may receive a text input from an electronic surface and generate one or more surfacing candidates based on processing the text input with the neural network. Examples of neural models that may process the text input include GPT models, BERT, ELMo, and RNN models. A predictive text n-gram model may similarly receive the text input from an electronic surface and generate one or more surfacing candidates based on processing the text input. Examples of n-gram models that may process the text input include 2-gram models, 3-gram models, and 4-gram models.

From operation 704A flow continues to operation 706A where a plurality of surfacing candidates is determined based on the processing of the text input with the predictive text model. Each of the plurality of surfacing candidates may comprise at least one word. In some examples, each of the plurality of surfacing candidates may be determined to have at least a threshold likelihood of being selected by a user for following the text input. The likelihood that a generated surfacing candidate may be selected by a user following the processed text input may correspond to a specific user account that entered the text input that is processed by the predictive text model, or the likelihood that a generated surfacing candidate may be selected may correspond to a plurality of user accounts. In some examples, the likelihood that a generated surfacing candidate may be selected may correspond to user-specific data and data from one or more other user accounts. In additional examples, the likelihood that a generated surfacing candidate may be selected by a user for following the text input may correspond to a surfacing score determined for a surfacing candidate. In the case of a predictive text neural model, a surfacing score for a surfacing candidate may be determined based at least on an embedding value for a surfacing candidate in relation to the text input. In the case of a predictive text n-gram model, a surfacing score for a surfacing candidate may be determined based at least on a frequency of the n-gram corresponding to the surfacing candidate in one or more corpus used to train the predictive text n-gram model.

From operation 706A flow continues to operation 708A where the predictive text filtering model is applied to a surfacing candidate of the plurality of candidates. In some examples, the predictive text filtering model may be applied to any text input in the application, surface, or operating system shell element where the text input was received. In additional examples, settings associated with a user account may be selectable for determining which applications, surfaces, or operating system shell elements the predictive text filtering model may process text for.

From operation 708A flow continues to operation 710A where the surfacing candidate is filtered by the predictive text filtering model. The surfacing candidate may be filtered from further processing because the surfacing candidate, alone or in combination with the text input, includes a first term that is identified as having a precarious classification within the range of the number of words (e.g., one word, two words, three words) from a second term that is identified as having a precarious classification. In addition, there may not be a cooccurrence exception that applies to the two precarious terms in their context in relation to one another and/or there may not be any range resetting characters or conjunctions between the two terms. In additional examples, the surfacing candidate may be filtered from further processing if it includes a precarious term within the range of the number of words from a blocklist term.

From operation 710A flow continues to operation 712A where at least one non-filtered surfacing candidate is caused to be displayed. The at least one non-filtered surfacing candidate may be displayed in the electronic surface where the text input was received. In some examples, the at least one non-filtered surfacing candidate may be selectable for inserting the non-filtered surfacing candidate into the electronic surface directly after the text input.

From operation 712A flow moves to an end operation and the method 700A ends.

Figure 7B:
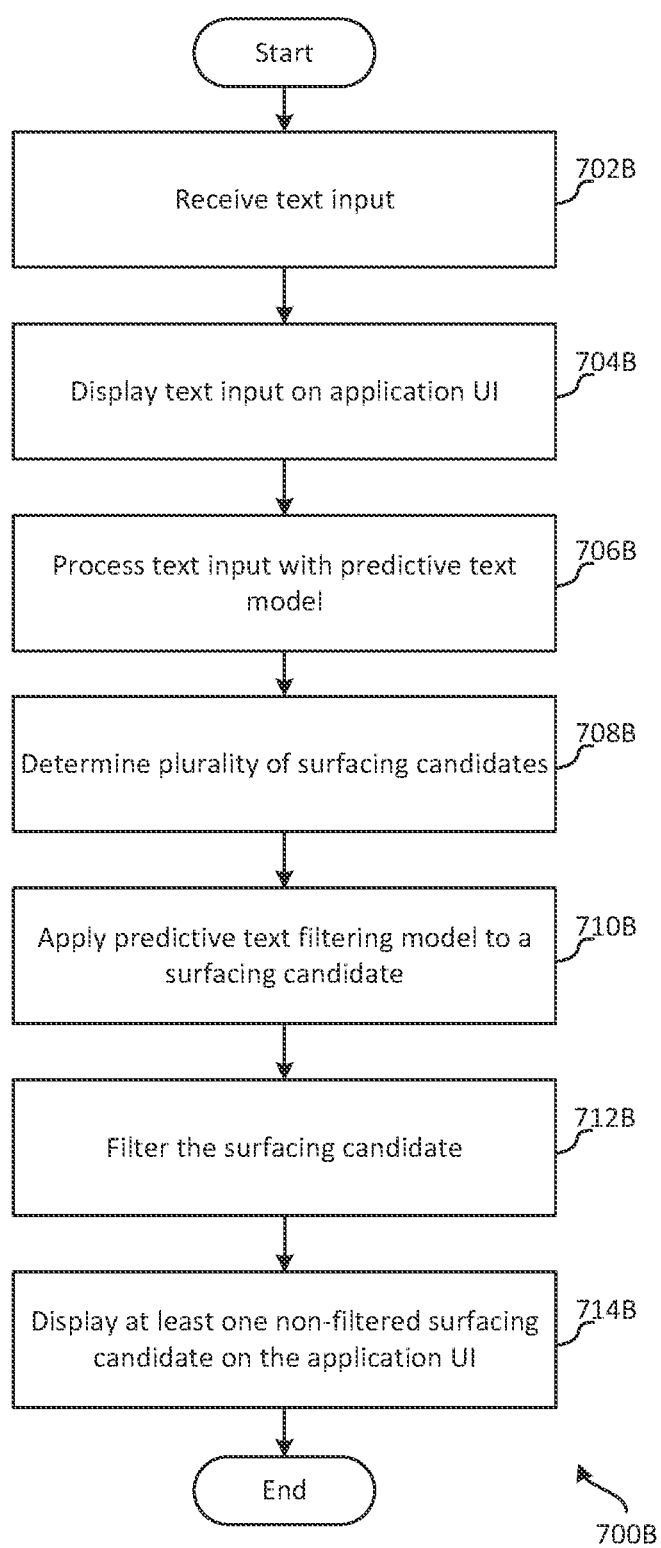
FIG. 7B is another exemplary method for assisting with filtering predictive text surfacing candidates.

FIG. 7B is another exemplary method 700B for assisting with filtering predictive text surfacing candidates. The method 700B begins at a start operation and flow moves to operation 702B.

At operation 702B a text input is received. The text input may comprise one or more text strings (e.g., text characters, words, sentences). The text input may be received by an application (e.g., email application, word processing application, calendar application, SMS application, group messaging application, collaboration application, social media application, web browser application, task management application, to-do list application, map application, game application, reservation application, presentation application, spreadsheet application). In additional examples the text input may be received by a predictive text service from an application or application service.

From operation 702B flow continues to operation 704B where the text input is displayed on an application user interface. The text input may have been typed or pasted in the application user interface, for example. In additional examples, the text input may initially be received in an audio format and transformed to a text input with a speech-to-text engine.

From operation 704B flow continues to operation 706B where the text input is processed with a predictive text model. The predictive text model may comprise one or more predictive text neural models and/or one or more predictive text n-gram models. A predictive text neural model may comprise a neural network that may receive a text input from an electronic surface and generate one or more surfacing candidates based on processing the text input with the neural network. Examples of neural models that may process the text input include GPT models, BERT, ELMo, and RNN models. A predictive text n-gram model may similarly receive the text input from an electronic surface and generate one or more surfacing candidates based on processing the text input. Examples of n-gram models that may process the text input include 2-gram models, 3-gram models, and 4-gram models.

From operation 706B flow continues to operation 708B where a plurality of surfacing candidates is determined based on the processing of the text with the predictive text model. Each of the plurality of surfacing candidates may comprise at least one word. In some examples, each of the plurality of surfacing candidates may be determined to have at least a threshold likelihood of being selected by a user for following the text input. The likelihood that a generated surfacing candidate may be selected by a user following the processed text input may correspond to a specific user account that entered the text input that is processed by the predictive text model, or the likelihood that a generated surfacing candidate may be selected may correspond to a plurality of user accounts. In some examples, the likelihood that a generated surfacing candidate may be selected may correspond to user-specific data and data from one or more other user accounts. In additional examples, the likelihood that a generated surfacing candidate may be selected by a user for following the text input may correspond to a surfacing score determined for a surfacing candidate. In the case of a predictive text neural model, a surfacing score for a surfacing candidate may be determined based at least on an embedding value for a surfacing candidate in relation to the text input. In the case of a predictive text n-gram model, a surfacing score for a surfacing candidate may be determined based at least on a frequency of the n-gram corresponding to the surfacing candidate in one or more corpus used to train the predictive text n-gram model and/or how similar the text input is to a surfacing candidate.

From operation 708B flow continues to operation 710B where a predictive text filtering model is applied to a surfacing candidate of the plurality of candidates. Application of the predictive text filtering model may comprise determining that the surfacing candidate or the text input includes a first term that is associated with a precarious classification in the predictive text filtering model, determining that the surfacing candidate or the text input includes a second term that is associated with the precarious classification in the predictive text filtering model, and determining that the first term is within a range of a number of words (e.g., one word, two words, three words) for filtering cooccurrences of precarious terms.

From operation 710B flow continues to operation 712B where the surfacing candidate is filtered by the predictive text filtering model. The surfacing candidate may be filtered from further processing because the first term is associated with a precarious classification in the predictive text filtering model and the second term is associated with a precarious classification in the text filtering model, and the first term is within the range of the number of words for filtering cooccurrences of precarious terms. In addition, there may not be a cooccurrence exception that applies to the two precarious terms in their context in relation to one another and/or there may not be any range resetting characters or conjunctions between the two terms. Additionally, for the surfacing candidate to be filtered, the first term and the second term need not necessarily be associated with a same precarious classification type.

From operation 712B flow continues to operation 714B where the at least one non-filtered surfacing candidate is displayed in the application user interface. The at least one non-filtered surfacing candidate may be displayed in the application user interface where the text input was received. In some examples, the at least one non-filtered surfacing candidate may be selectable for inserting the non-filtered surfacing candidate into the application user interface directly after the text input.

From operation 714B flow moves to an end operation and the method 700B ends.

Figure 7C:
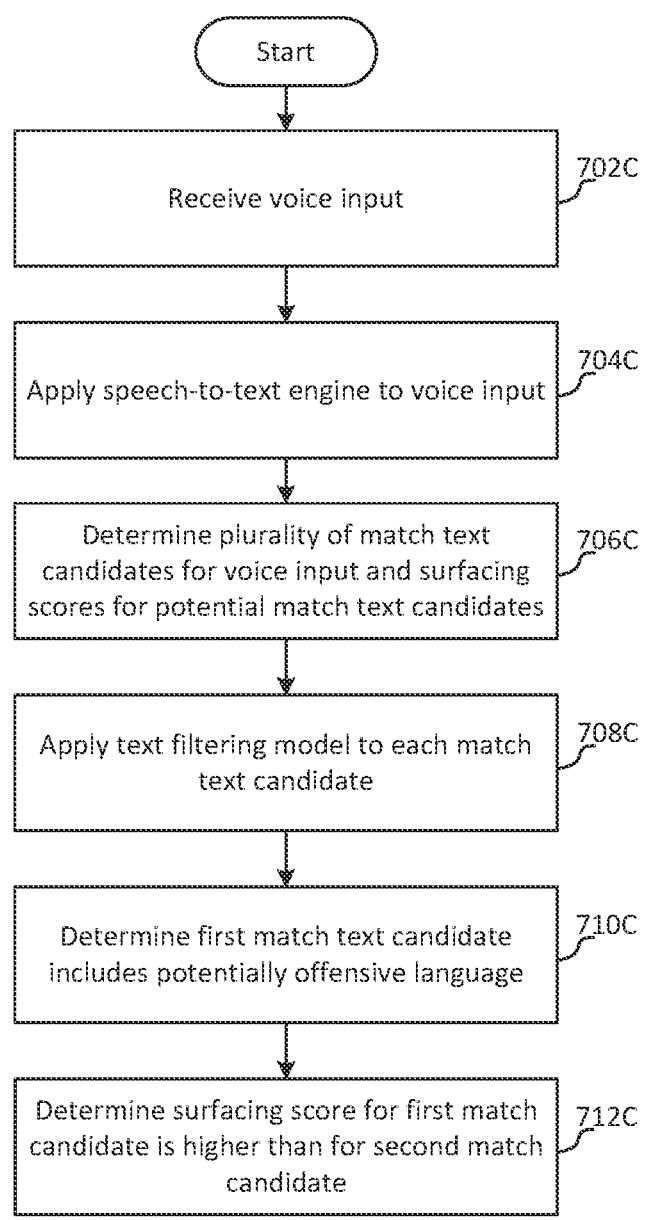

FIGS. 7C and 7D are an exemplary method 700C/700D for applying a text filtering model to a plurality of match text candidates generated by a speech-to-text engine. The method 700C begins at FIG. 7C and continues through FIG. 7D and the method 700D. The method 700C/700D begins at a start operation and flow moves to operation 702C.

At operation 702C a voice input is received. The voice input may be received by a microphone of computing device (e.g., client computing device 104, mobile computing device 106). In additional examples, the voice input may be initially received by a microphone and sent to a speech-to-text service and/or a text filtering service.

From operation 702C flow continues to operation 704C where a speech-to-text engine (e.g., speech-to-text engine 140) is applied to the voice input. Although speech-to-text engine 140 is illustrated as being included in predictive text service 132, in some examples where predictive text engine 134 is not applied, speech-to-text engine 140 may be included as a separate service. For example, a user may simply be using dictation software that a speech-to-text engine and a text filtering model is being applied to, or a voicemail transcription service may utilize a speech-to-text engine and a text filtering model. The speech-to-text engine may be applied to the voice input based on settings associated with an application that is currently being executed by an open application or settings associated with an operating system or operating system shell element. In other examples, the speech-to-text engine may be applied to the voice input based on being provided to a digital assistant executed all or in part by the computing device that receives the voice input.

From operation 704C flow continues to operation 706C where a plurality of match text candidates for the voice input are determined by the speech-to-text engine and surfacing scores for each of the plurality of match text candidates are also determined. A match text candidate for a voice input may comprise one or more words or terms that the speech-to-text engine determines match a voice input to a threshold degree of confidence (e.g., a confidence score above 75%, a confidence score above 90%) based on its processing of the voice input. Thus, more than one match text candidate may be determined for a voice input. The surfacing score for each of the plurality of match text candidates may correspond to a corresponding confidence score that is calculated by the speech-to-text engine.

From operation 706C flow continues to operation 708C where a text filtering model is applied to each of the plurality of match text candidates. In examples, the text filtering model that is applied at operation 708C may be substantially similar to or the same as predictive text filtering model 146. For example, the text filtering model may comprise a plurality of terms that are associated in the text filtering model with a precarious classification. In some examples, the precarious terms may be associated with a precarious classification type (e.g., country names, company names, nouns for ethnic groups, nouns for minority groups, nouns for targets of bias, verbs of violence, verbs of touching, and in some examples a miscellaneous classification for terms that do not meet those previously mentioned categorizations yet are still precarious in nature). The association may comprise being tagged (e.g., with metadata) with the classification or being associated with the classification in a relational database, for example. In other examples, the precarious terms may not necessarily be tagged or otherwise associated with a precarious category type. In some examples, the plurality of terms may be stored in a storage location comprising a flat file database (e.g., a database that stores data in a plain text format). In other examples, the precarious terms may be stored in a relational database. In some examples, the precarious terms may be manually identified (e.g., by an administrative user) from one or more corpus and added to a precarious term storage location. In other examples, the precarious terms may be automatically identified using one or more embedding models (e.g., sent-2-vec, ELMo, BERT) comprised of vectors generated from one or more corpus, and added to a precarious term storage location. In additional examples, a combination of manual classification and automatic classification may be utilized to identify precarious terms.

The text filtering model may further comprise a range of a number of words for filtering cooccurrences of precarious terms from the plurality of terms. The range may comprise a rule that is applied by the text filtering model to a match text candidate, that specifies that if a first precarious term in the match text candidate is within a specific number of words from a second precarious term in the match text candidate, the match text candidate must have to meet a heightened threshold surfacing value to be surfaced unless the match text candidate meets a cooccurrence exception or there is a range resetting character or conjunction between the two precarious terms.

From operation 708C flow continues to operation 710C where a first match text candidate of the plurality of match text candidates is determined to include potentially offensive language based on the processing performed at operation 708C. That is, the text filtering engine may have identified a first precarious term within the range of the number of words for filtering cooccurrences of precarious terms from the plurality of terms, of a second precarious term.

From operation 710C flow continues to operation 712C where a determination is made that a surfacing score for the first match text candidate of the plurality of match text candidates is higher than a surfacing score for a second match text candidate of the plurality of match text candidates.

From operation 712C flow continues to operation 714D (FIG. 700D). At operation 714D a determination is made as to whether the surfacing score for the first match text candidate is above a heightened threshold value. That is, to be surfaced and/or displayed, the first match text candidate may have to have a surfacing score that meets a threshold that is higher than a threshold for other match text candidates that have not been determined to include potentially offensive language based on application of the text filtering model. In this manner, the text filtering model may only allow potentially, or likely, offensive language to be surfaced from a voice input processed by a speech-to-text engine if the text filtering model determines to a heightened degree of certainty that the user really wants the output to include that potentially, or likely, offensive language.

If at operation 714D a determination is made that the surfacing score for the first match text candidate is above the heightened threshold value, flow moves to operation 718D where the first match text candidate is displayed by a computing device (e.g., client computing device 104, mobile computing device 106) or otherwise surfaced (e.g., audibly produced, brail haptic output).

From operation 718D flow moves to an end operation and the method 700C/700D ends.

Alternatively, if at operation 714D a determination is made that the surfacing score for the first match text candidate is not above the heightened threshold value, flow moves to operation 716D where the second match text candidate is displayed by a computing device (e.g., client computing device 104, mobile computing device 106) or otherwise surfaced (e.g., audibly produced, brail haptic output).

From operation 716D flow moves to an end operation and the method 700C/700D ends.

Figure 8:
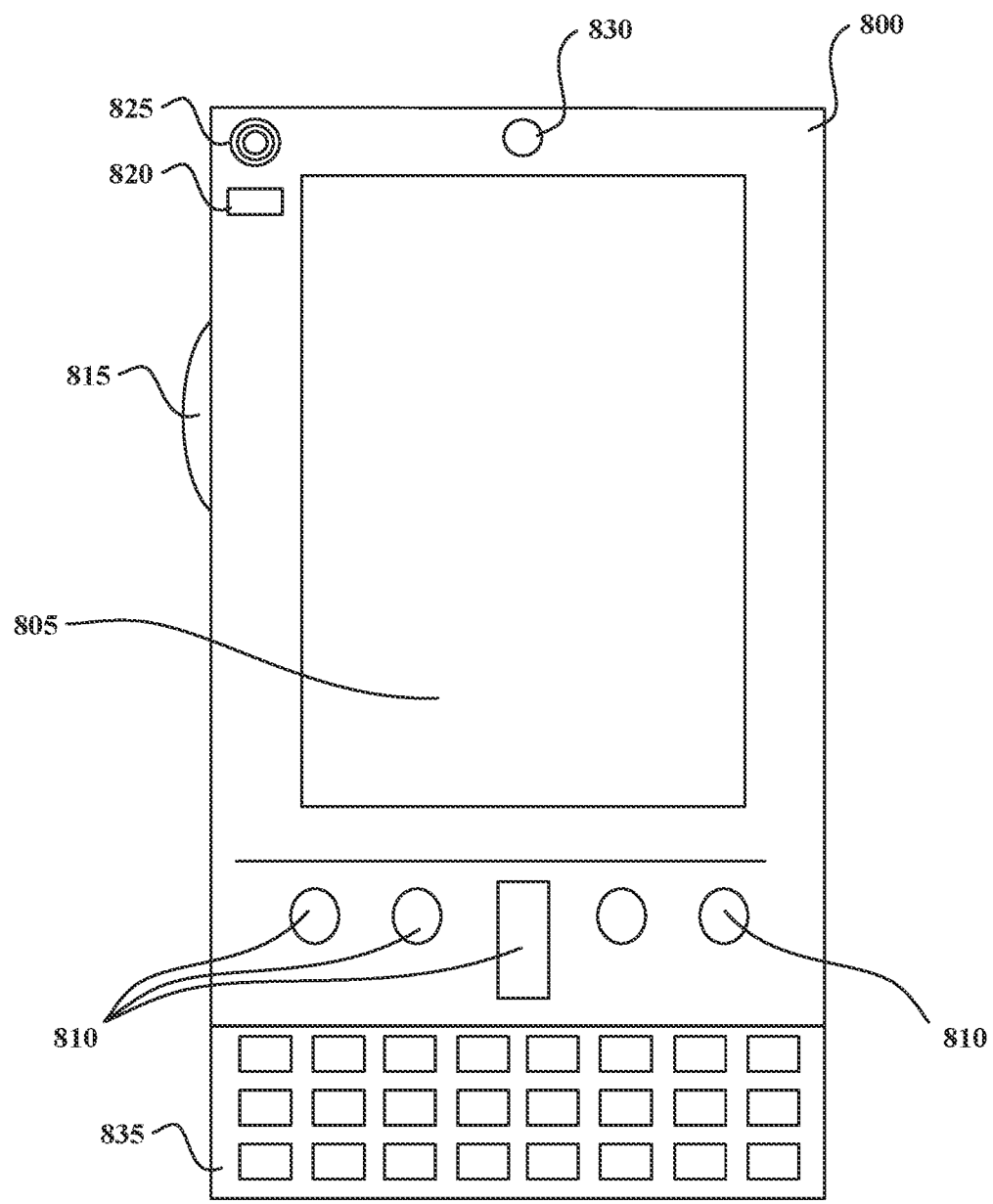
FIGS. 8 and 9 are simplified diagrams of a mobile computing device with which aspects of the disclosure may be practiced.
Figure 9:
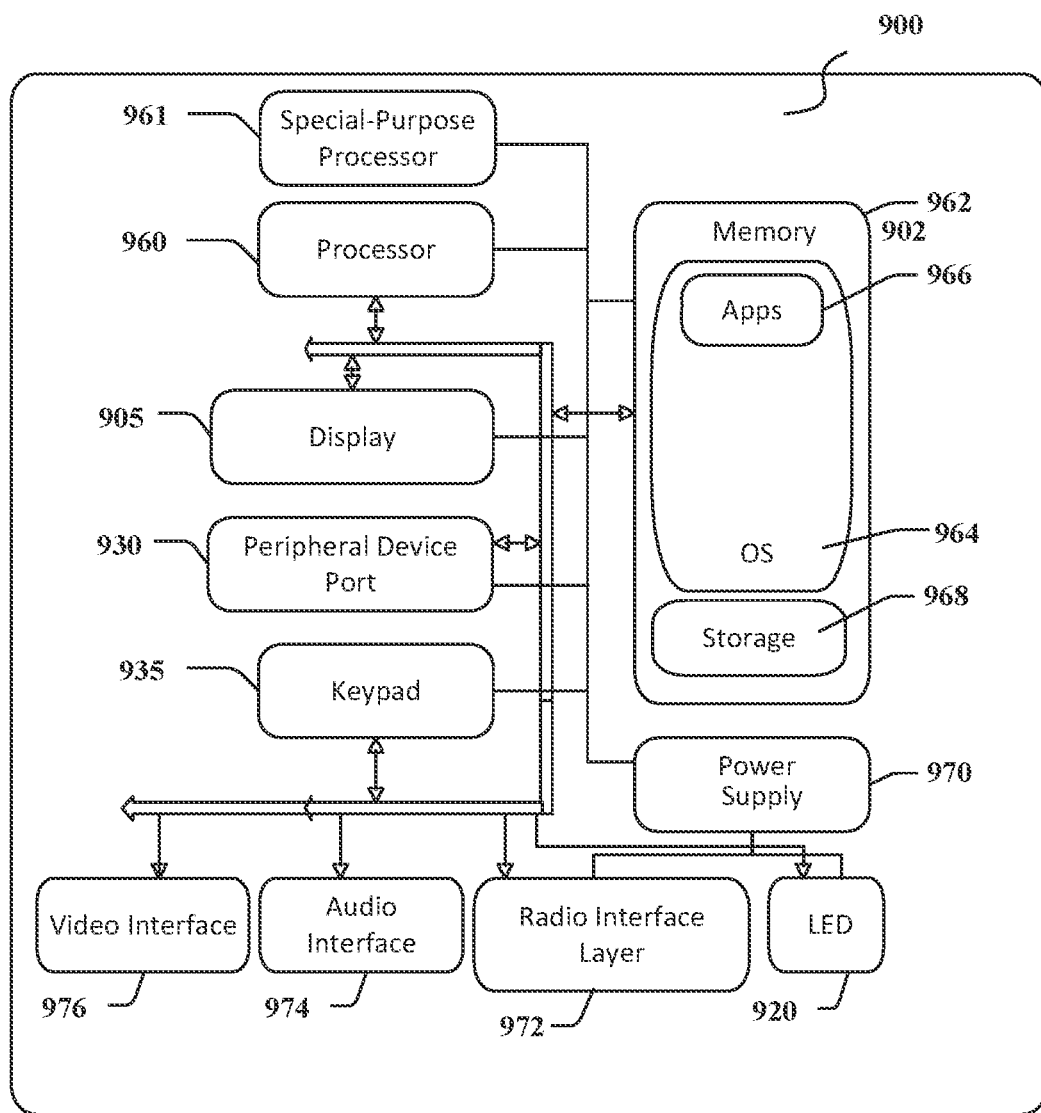

FIGS. 8 and 9 illustrate a mobile computing device 800, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 8, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or fewer input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 9 is a block diagram illustrating the architecture of one aspect of a mobile computing device. That is, the mobile computing device 900 can incorporate a system (e.g., an architecture) 902 to implement some aspects. In one embodiment, the system 902 is implemented as a "smart phone" capable of running one or more applications (e.g., browser, e-mail, calendaring, contact managers, messaging clients, games, and media clients/players). In some aspects, the system 902 is integrated as a computing device, such as an integrated personal digital assistant (PDA) and wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900, including instructions for providing and operating an asset disposition engine.

The system 902 has a power supply 970, which may be implemented as one or more batteries. The power supply 970 might further include an external power source, such as an AC adapter or a powered docking cradle that supplements or recharges the batteries.

The system 902 may also include a radio interface layer 972 that performs the function of transmitting and receiving radio frequency communications. The radio interface layer 972 facilitates wireless connectivity between the system 902 and the "outside world," via a communications carrier or service provider. Transmissions to and from the radio interface layer 972 are conducted under control of the operating system 964. In other words, communications received by the radio interface layer 972 may be disseminated to the application programs 966 via the operating system 964, and vice versa.

The visual indicator 820 may be used to provide visual notifications, and/or an audio interface 974 may be used for producing audible notifications via the audio transducer 825. In the illustrated embodiment, the visual indicator 820 is a light emitting diode (LED) and the audio transducer 825 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 825, the audio interface 974 may also be coupled to a microphone to receive audible input, such as to facilitate a telephone conversation. In accordance with embodiments of the present disclosure, the microphone may also serve as an audio sensor to facilitate control of notifications, as will be described below. The system 902 may further include a video interface 976 that enables an operation of an on-board camera 830 to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9 by the non-volatile storage area 968.

Data/information generated or captured by the mobile computing device 900 and stored via the system 902 may be stored locally on the mobile computing device 900, as described above, or the data may be stored on any number of storage media that may be accessed by the device via the radio interface layer 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio interface layer 972 or via a distributed computing network. Similarly, such data/information may be readily transferred between computing devices for storage and use according to well-known data/information transfer and storage means, including electronic mail and collaborative data/information sharing systems.

Figure 10:
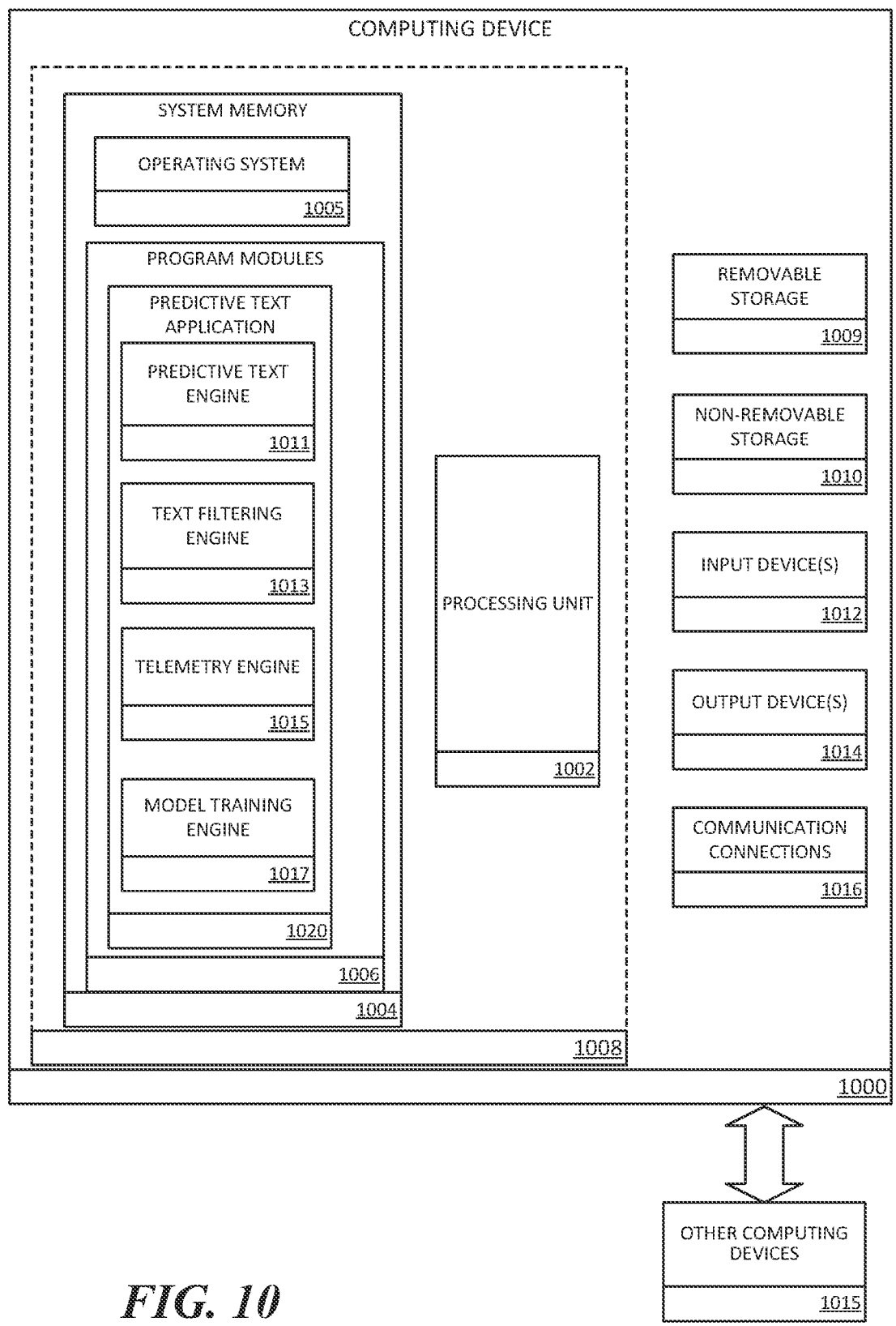
FIG. 10 is a block diagram illustrating example physical components of a computing device with which aspects of the disclosure may be practiced.

FIG. 10 is a block diagram illustrating physical components (e.g., hardware) of a computing device 1000 with which aspects of the disclosure may be practiced. The computing device components described below may have computer executable instructions for assisting with surfacing a resource on a target device in its same state from an application executed on a source device via transformation of application context data. In a basic configuration, the computing device 1000 may include at least one processing unit 1002 and a system memory 1004. Depending on the configuration and type of computing device, the system memory 1004 may comprise, but is not limited to, volatile storage (e.g., random access memory), non-volatile storage (e.g., read-only memory), flash memory, or any combination of such memories. The system memory 1004 may include an operating system 1005 suitable for running one or more software applications. The operating system 1005, for example, may be suitable for controlling the operation of the computing device 1000. Furthermore, embodiments of the disclosure may be practiced in conjunction with a graphics library, other operating systems, or any other application program and is not limited to any particular application or system. This basic configuration is illustrated in FIG. 10 by those components within a dashed line 1008. The computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by a removable storage device 1009 and a non-removable storage device 1010.

As stated above, a number of program modules and data files may be stored in the system memory 1004. While executing on the processing unit 1002, the program modules 1006 (e.g., predictive text application 1020) may perform processes including, but not limited to, the aspects, as described herein. Predictive text engine 1011 may perform one or more operations associated with receiving a text input and processing that text input with one or more predictive text neural models and/or one or more predictive text n-gram models to identify one or more surfacing candidates that are likely to be selected by a user for following the text input. Text filtering engine 1013 may perform one or more operations associated with processing a surfacing candidate to determine whether it includes a first term that is associated with a precarious classification within a range of words from a second term that is associated with a precarious classification (in the same surfacing candidate or in a text input the surfacing candidate would follow). If so, and there are no cooccurrence exceptions that apply to the two precarious terms in their context in relation to one another, and there are no range resetting characters or conjunctions between the two terms, text filtering engine 1013 may filter the surfacing candidate from further processing. Telemetry engine 1015 may perform one or more operations associated with requesting and/or receiving feedback related to surfaced predictive text. Model training engine 1017 may receive feedback related to surfaced predictive text. The feedback may be received directly from a user device, or the feedback may be received from telemetry engine 1015. Model training engine 1017 may use the feedback to train and update one or more models included in predictive text engine 1011 and/or speech-to-text engine 140.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1000 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1000 may also have one or more input device(s) 1012 such as a keyboard, a mouse, a pen, a sound or voice input device, a touch or swipe input device, etc. The output device(s) 1014 such as a display, speakers, a printer, etc. may also be included. The aforementioned devices are examples and others may be used. The computing device 1000 may include one or more communication connections 1016 allowing communications with other computing devices 1050. Examples of suitable communication connections 1016 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1004, the removable storage device 1009, and the non-removable storage device 1010 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1000. Any such computer storage media may be part of the computing device 1000. Computer readable media and computer storage media as described herein does not include transitory media such as a carrier wave or other propagated or modulated data signal. A computer readable storage device as described herein does not include transitory media such as a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 11:
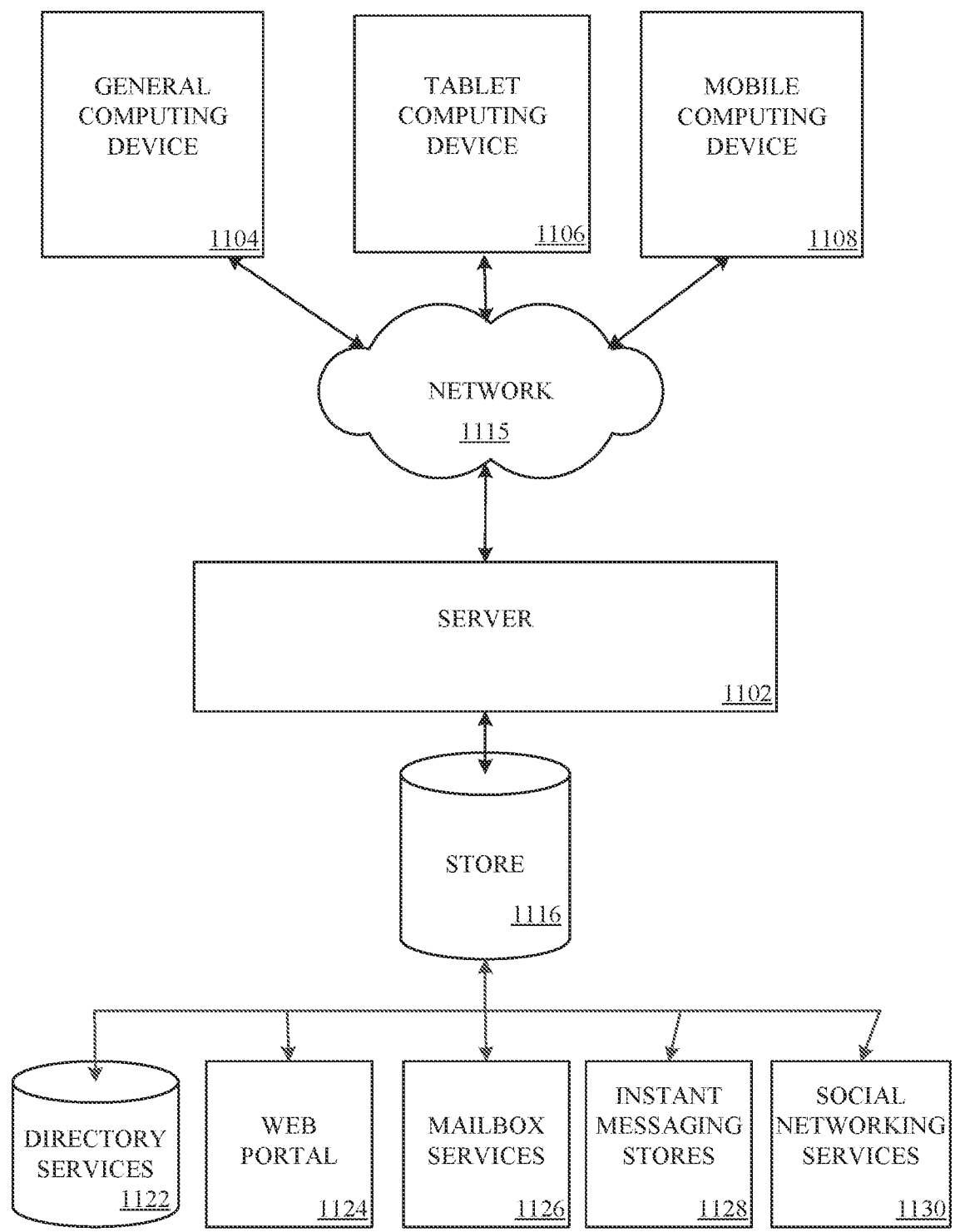
FIG. 11 is a simplified block diagram of a distributed computing system in which aspects of the present disclosure may be practiced.

FIG. 11 illustrates one aspect of the architecture of a system for processing data received at a computing system from a remote source, such as a personal/general computer 1104, tablet computing device 1106, or mobile computing device 1108, as described above. Content displayed at server device 1102 may be stored in different communication channels or other storage types. For example, various documents may be stored using a directory service 1122, a web portal 1124, a mailbox service 1126, an instant messaging store 1128, or a social networking site 1130. The program modules 1006 may be employed by a client that communicates with server device 1102, and/or the program modules 1006 may be employed by server device 1102. The server device 1102 may provide data to and from a client computing device such as a personal/general computer 1104, a tablet computing device 1106 and/or a mobile computing device 1108 (e.g., a smart phone) through a network 1115. By way of example, the computer system described above may be embodied in a personal/general computer 1104, a tablet computing device 1106 and/or a mobile computing device 1108 (e.g., a smart phone). Any of these embodiments of the computing devices may obtain content from the store 1116, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure. The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method for filtering predictive text, the method comprising:

generating, by a predictive text model comprising an artificial neural network trained to generate text completions based on text data, a plurality of suggested completions for a text input;

submitting, to a predictive text filtering model, a text string, wherein the text string comprises the text input and a suggested completion of the plurality of suggested completions and wherein the predictive text filtering model comprises:

a plurality of terms that are associated in the predictive text filtering model with a precarious classification and, for at least a first term of the plurality of terms, a rule specifying a number of words within which the first term is allowed to cooccur with at least a second term of the plurality of terms; and a plurality of cooccurrence exceptions that are automatically ignored from filtering by the predictive text filtering model;

filtering, by the predictive text filtering model, the suggested completion based on the first term in the text string cooccurring within the number of words from the second term in the text string; and selecting, from one or more non-filtered text completions of the plurality of suggested completions, a non-filtered suggested completion to be displayed, wherein a text string formed by the text input and the non-filtered suggested completion does not include a term with a precarious classification which cooccurs within the number of words of the first term.

2. The computer-implemented method of claim 1, wherein filtering the suggested completion further comprises:

determining that the suggested completion comprises a first term that is associated with the precarious classification in the predictive text filtering model;

determining that the suggested completion comprises a second term that is associated with the precarious classification in the predictive text filtering model; and determining that the first term is within the number of words from the second term.

3. The computer-implemented method of claim 1, wherein filtering the suggested completion further comprises:

determining that the text input comprises a first term that is associated with the precarious classification in the predictive text filtering model;

determining that the suggested completion comprises a second term that is associated with the precarious classification in the predictive text filtering model; and determining that the first term is within the number of words from the second term.

4. The computer-implemented method of claim 1, wherein the plurality of cooccurrence exceptions comprise:

a first country name directly followed by a second country name; and a first company name directly followed by a second company name.

5. The computer-implemented method of claim 1, wherein the plurality of terms that are associated in the predictive text filtering model with a precarious classification comprise:

country names,
company names,
nouns for ethnic groups,
nouns for minority groups,
nouns for targets of bias,
verbs of violence, and
verbs of touching.

6. The computer-implemented method of claim 1, further comprising:

identifying from a corpus, using a text embedding model that has been trained to identify precarious terms, a plurality of precarious terms; and associating the plurality of precarious terms identified using the text embedding model with the precarious classification in the predictive text filtering model.

7. The computer-implemented method of claim 1, wherein the predictive text filtering model further comprises a plurality of punctuation characters and conjunctions that reset the number of words for filtering cooccurrences of precarious terms from the plurality of terms when the predictive text filtering model is applied.

8. The computer-implemented method of claim 1, wherein the predictive text model comprises at least one of: an n-gram model, and a generative pre-trained transformer model.

9. The computer-implemented method of claim 1, further comprising:

assigning a surfacing score to each of the plurality of suggested completions;

filtering each of the suggested completions that have a surfacing score below a threshold value from processing by the predictive text filtering model; and applying the predictive text filtering model to each of the suggested completions that has a surfacing score above the threshold value.

10. The computer-implemented method of claim 1, wherein the rule specifying the number of words is further applied for filtering cooccurrences of precarious terms from the plurality of terms and terms included in a blocklist.

11. The computer-implemented method of claim 10, wherein applying the predictive text filtering model to the suggested completion further comprises:

determining that the suggested completion comprises a term that is associated with the precarious classification in the predictive text filtering model;

determining that the text input includes a term included in the blocklist; and determining that the term, in the suggested completion, that is associated with the precarious classification would be within the number of words from the term included in the blocklist in the text input if the suggested completion were added to the text input.

12. The computer-implemented method of claim 1, further comprising:

applying a blocklist filter comprising a plurality of blocklist terms to the plurality of suggested completions;

determining that one of the suggested completions includes one of the plurality of blocklist terms; and filtering the suggested completion that includes one of the plurality of blocklist terms from being processed further.

13. The computer-implemented method of claim 1, wherein the number of words for filtering cooccurrences of precarious terms from the plurality of terms comprises one of: two words, three words, four words, five words, and six words.

14. A system comprising:

a memory for storing executable program code; and a processor, functionally coupled to the memory, the processor being responsive to computer-executable instructions contained in the program code and operative to:

submit, to a predictive text filtering model, a text string, wherein the text string comprises a text input and a suggested completion of a plurality of suggested completions, wherein the plurality of suggested completions were generated by a predictive text model for the text input, wherein the predictive text model comprises an artificial neural network trained to generate text completions based on text data and wherein the predictive text filtering model comprises:

a plurality of terms that are associated in the predictive text filtering model with a precarious classification, and, for at least a first term of the plurality of terms, a rule specifying a number of words within which the first term is allowed to cooccur with at least a second term of the plurality of terms; and a plurality of cooccurrence exceptions that are automatically ignored from filtering by the predictive text filtering model;

filter, by the predictive text filtering model, the suggested completion based on the first term in the text string cooccurring within the number of words from the second term in the text string; and select, from one or more non-filtered text completions of the plurality of suggested completions, a non-filtered suggested completion to be displayed, wherein a text string formed by the text input and the non-filtered suggested completion does not include a term with a precarious classification which cooccurs within the number of words of the first term.

15. The system of claim 14, wherein to filter the suggested completion, the processor is further responsive to the computer-executable instructions contained in the program code and operative to:

determine that the suggested completion comprises a first term that is associated with the precarious classification in the predictive text filtering model;

determine that the suggested completion comprises a second term that is associated with the precarious classification in the predictive text filtering model; and determine that the first term is within the number of words from the second term.

16. The system of claim 14, wherein to filter the suggested completion, the processor is further responsive to the computer-executable instructions contained in the program code and operative to:

determine that the text input comprises a first term that is associated with the precarious classification in the predictive text filtering model;

determine that the suggested completion comprises a second term that is associated with the precarious classification in the predictive text filtering model; and determine that the first term is within the number of words from the second term.

17. The system of claim 14, wherein the predictive text filtering model further comprises:

a plurality of cooccurrence exceptions that are automatically ignored from filtering by the predictive text filtering model; and a plurality of punctuation characters that reset the number of words for filtering cooccurrences of precarious terms from the plurality of terms when the predictive text filtering model is applied.

18. A computer-readable storage device comprising executable instructions that, when executed by a processor, assist with filtering predictive text suggested completions, the computer-readable storage device including instructions executable by the processor for:

receiving a text input;

receiving, from a predictive text model comprising an artificial neural network trained to generate text completions based on text data, a plurality of suggested completions generated by the predictive text model for the text input;

applying a predictive text filtering model to a suggested completion of the plurality of suggested completions, wherein applying the predictive text filtering model comprises:

determining that the suggested completion or the text input includes a first term that is associated with a precarious classification in the predictive text filtering model, determining that the suggested completion or the text input includes a second term that is associated with the precarious classification in the predictive text filtering model, and determining, according to a rule of the predictive text filtering model, that the first term is within a number of words from the second term based on determining a count of words between the first term and the second term, wherein the rule specifies the number of words that the first term is allowed to cooccur with the second term for filtering cooccurrences of precarious terms, wherein the predictive text filtering model comprises a plurality of cooccurrence exceptions that are automatically ignored from filtering by the plurality of text filtering model;

filtering, by the predictive text filtering model, the suggested completion; and causing at least one non-filtered suggested completion to be displayed on an application user interface, wherein a text string formed by the text input and the non-filtered suggested completion does not include a term with a precarious classification which occurs within the number of words of the first term.

19. The computer-readable storage device of claim 18, wherein applying the predictive text filtering model to the suggested completion of the plurality of suggested completions further comprises:

determining that an occurrence of the first term in combination with an occurrence of the second term does not correspond to a cooccurrence exception of the plurality of cooccurrence exceptions.

20. The computer-readable storage device of claim 18, wherein the instructions are further executable by the processor:

assigning a surfacing score to each of the plurality of suggested completions;

filtering each of the suggested completions that have a surfacing score below a threshold value from processing by the predictive text filtering model; and applying the predictive text filtering model to each of the suggested completions that has a surfacing score above the threshold value.

* * * * *